(12) United States Patent
O'Connor

(10) Patent No.: US 7,993,717 B2
(45) Date of Patent: Aug. 9, 2011

(54) COVERING OR TILE, SYSTEM AND METHOD FOR MANUFACTURING CARPET COVERINGS OR TILES, AND METHODS OF INSTALLING COVERINGS OR CARPET TILES

(75) Inventor: Lawrence Joseph O'Connor, Sarasota, FL (US)

(73) Assignee: LJ's Products, LLC, Sarasota, FL (US)

( * ) Notice: Subject to any disclaimer, the term of this patent is extended or adjusted under 35 U.S.C. 154(b) by 107 days.

(21) Appl. No.: 12/181,493

(22) Filed: Jul. 29, 2008

(65) Prior Publication Data
US 2009/0032180 A1 Feb. 5, 2009

Related U.S. Application Data

(60) Provisional application No. 60/953,519, filed on Aug. 2, 2007.

(51) Int. Cl.
*B32B 29/02* (2006.01)
(52) U.S. Cl. ...................... 428/40.1; 428/41.8
(58) Field of Classification Search .............. 428/40.3, 428/41.8, 88, 95; 156/249
See application file for complete search history.

(56) References Cited

U.S. PATENT DOCUMENTS

| | | | |
|---|---|---|---|
| 3,010,859 A | 11/1961 | Stephens et al. | |
| 3,014,829 A | 12/1961 | Curtin | |
| 3,135,647 A | 6/1964 | Wheeley | |
| 3,283,284 A * | 11/1966 | Eisler | 338/212 |
| 3,819,452 A | 6/1974 | Soehngen | |
| 3,937,640 A | 2/1976 | Tajima et al. | |
| 4,554,194 A | 11/1985 | Haas et al. | |
| 4,557,774 A | 12/1985 | Hoopengardner | |
| 4,680,209 A | 7/1987 | Zybko et al. | |
| 4,695,493 A | 9/1987 | Friedlander et al. | |
| 4,849,267 A | 7/1989 | Ward et al. | |
| 4,988,551 A | 1/1991 | Zegler | |
| 5,104,712 A | 4/1992 | Walters | |
| 5,204,155 A | 4/1993 | Bell et al. | |
| 5,532,035 A | 7/1996 | Corbin et al. | |
| 6,966,963 B2 * | 11/2005 | O'Connor | 156/249 |
| 2005/0112316 A1 * | 5/2005 | O'Connor | 428/40.1 |
| 2005/0158503 A1 * | 7/2005 | O'Connor | 428/40.1 |

FOREIGN PATENT DOCUMENTS

| | | |
|---|---|---|
| GB | 1007281 A | 10/1965 |
| GB | 2163973 A | 3/1986 |
| WO | 9100804 A1 | 1/1991 |

* cited by examiner

*Primary Examiner* — Khanh Nguyen
*Assistant Examiner* — Vishal I Patel
(74) *Attorney, Agent, or Firm* — Jacox, Meckstroth & Jenkins

(57) ABSTRACT

A covering is provided for exterior or interior application on solid surfaces such as garage floors, patios, and walkways. The covering is formed as tiles formed of a top layer of fibrous material, such as carpet, and a bottom layer of adhesive applied in spaced bands, lines, strips or rows that allow the tile to be removed from the surface after installation if desired. A release sheet, preferably formed of plural pieces, is secured over the adhesive for removal during installation. A portion of the release sheet can function as a positioning strip to assist in accurately placing the tiles. The covering is manufactured by coating the bottom surface of a strip of material in beads of adhesive, smoothing the beads into bands, lines, strips or rows, and then cutting the strip into tiles using a non-mechanical cutter such as a laser.

37 Claims, 21 Drawing Sheets

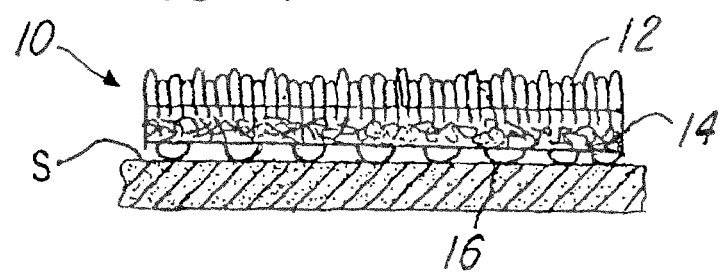
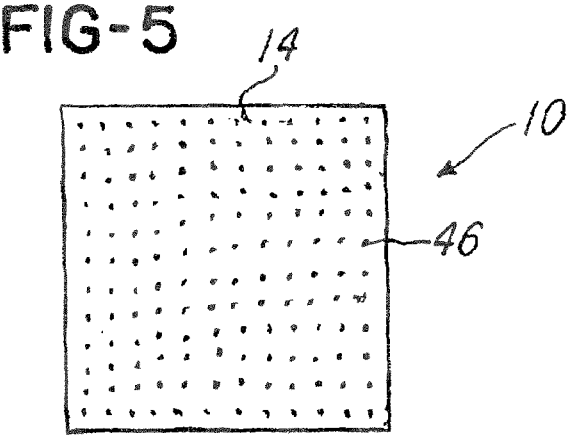
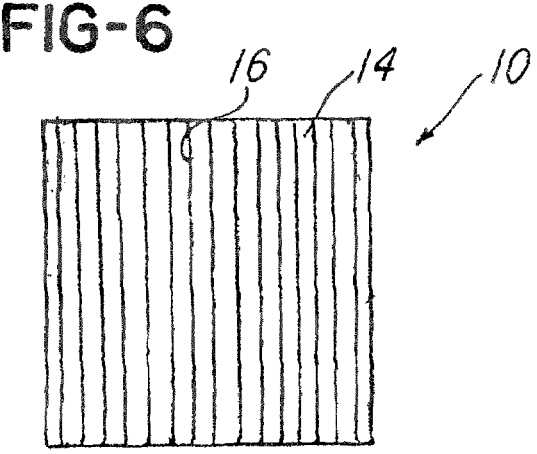

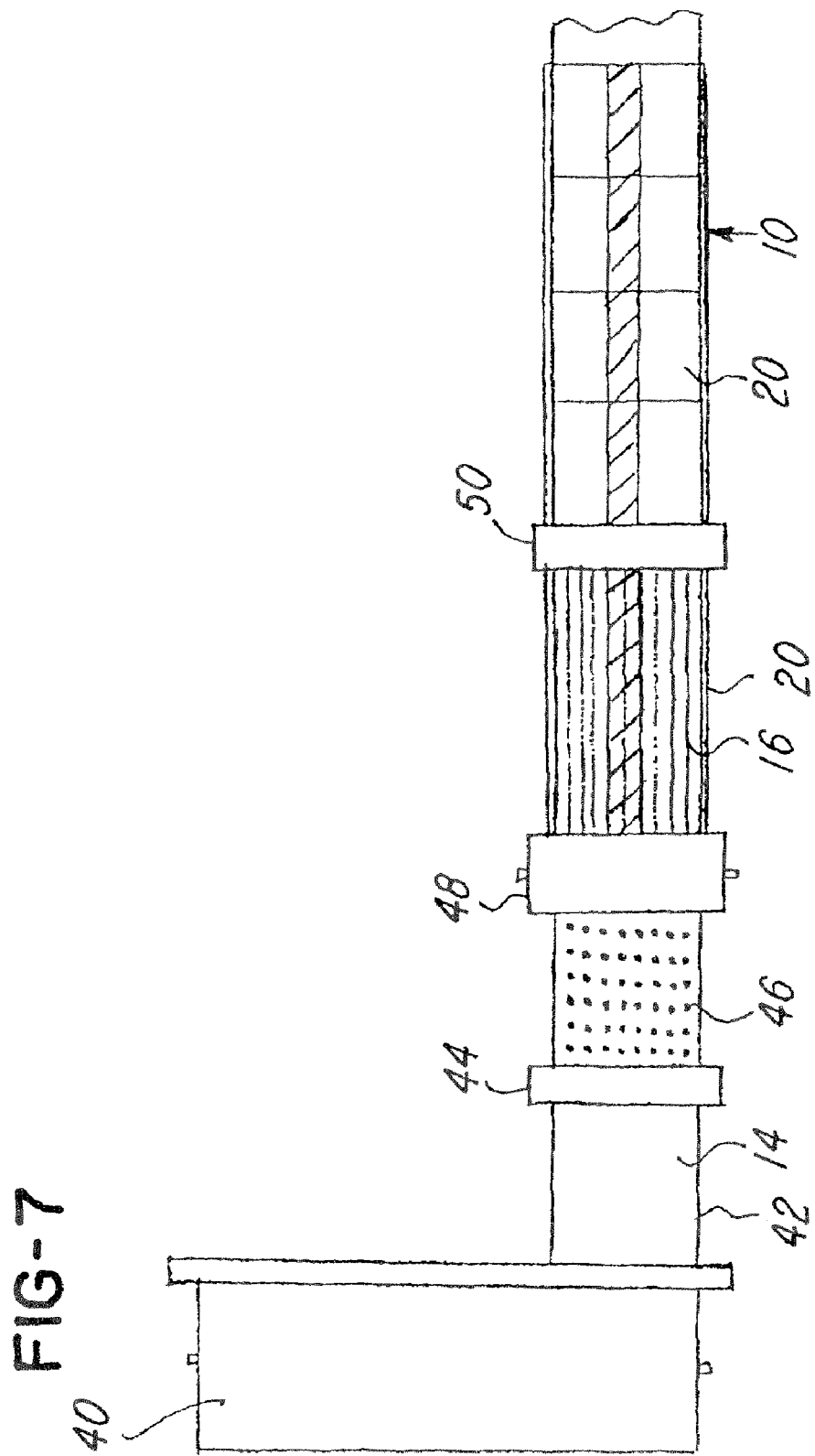

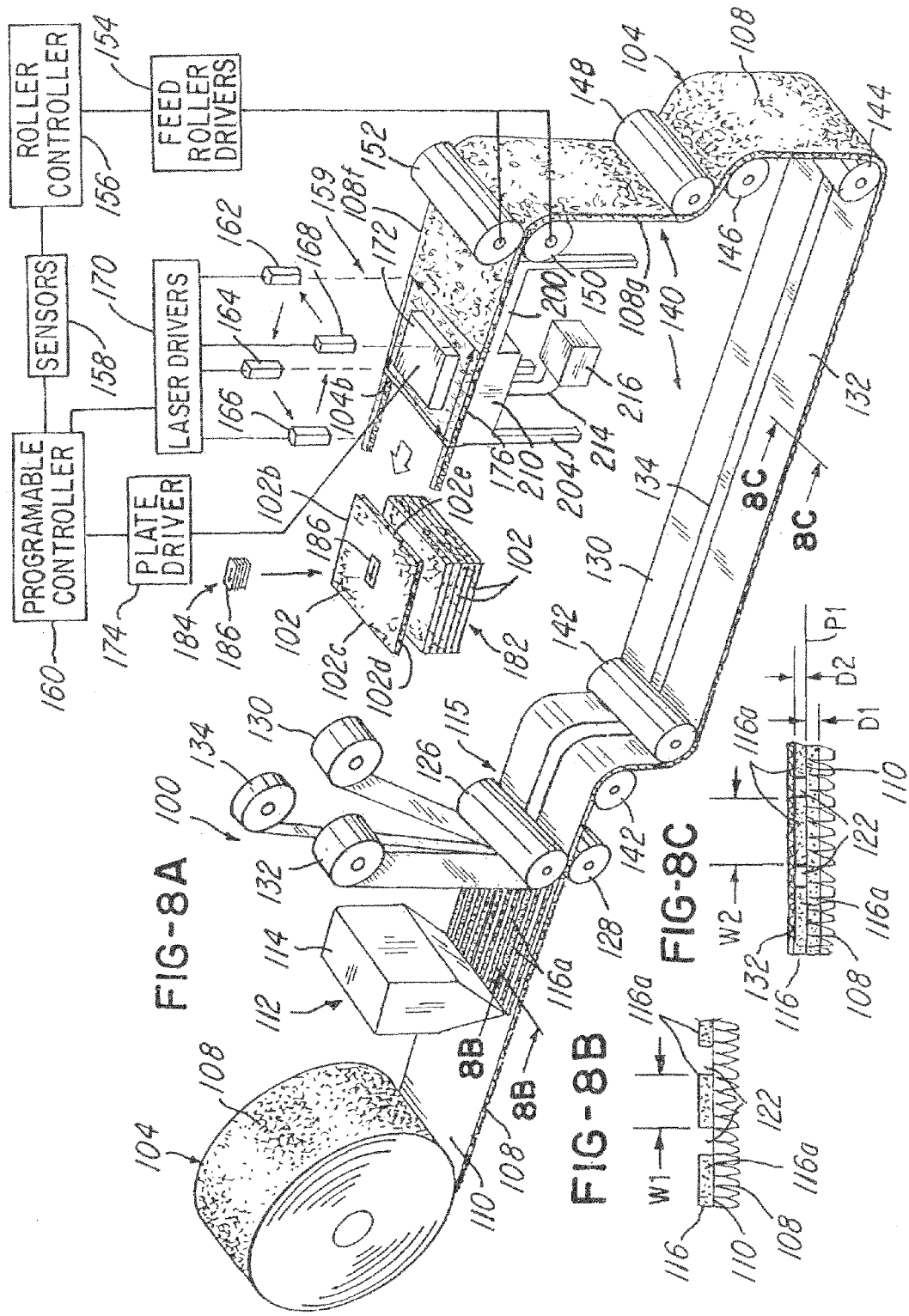

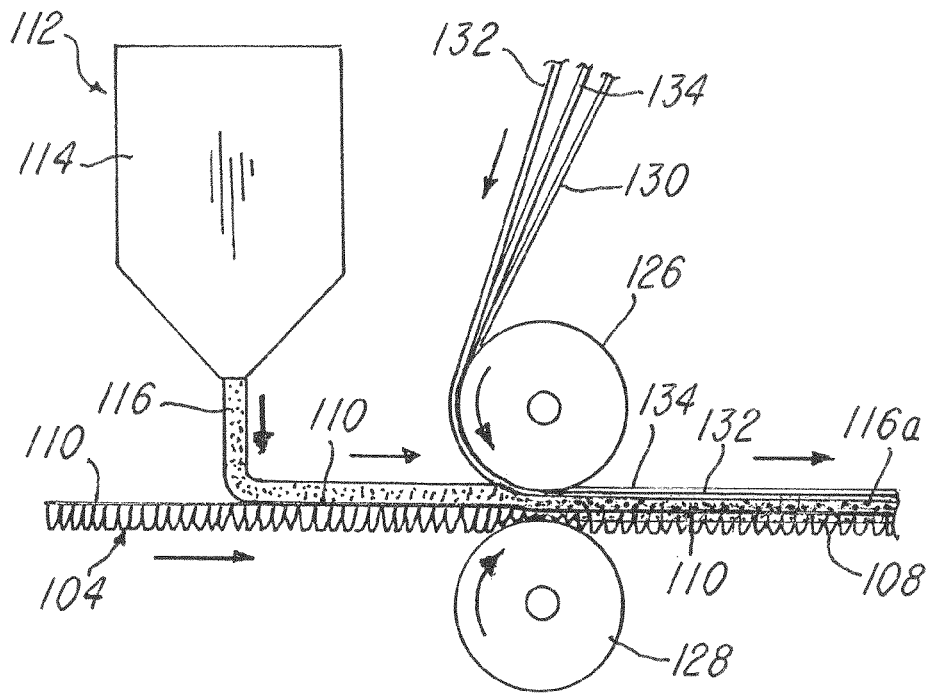
FIG-9
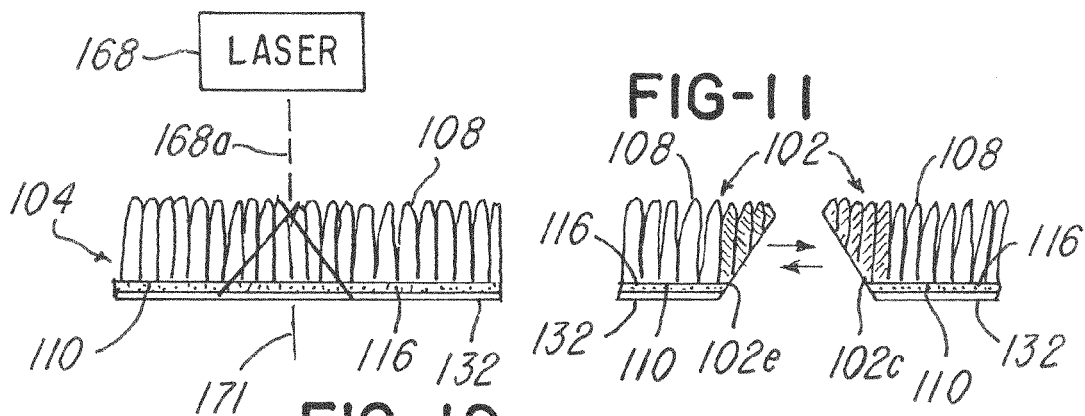
FIG-10
FIG-11
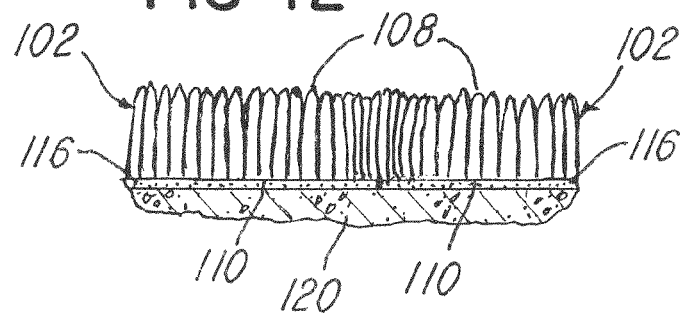
FIG-12

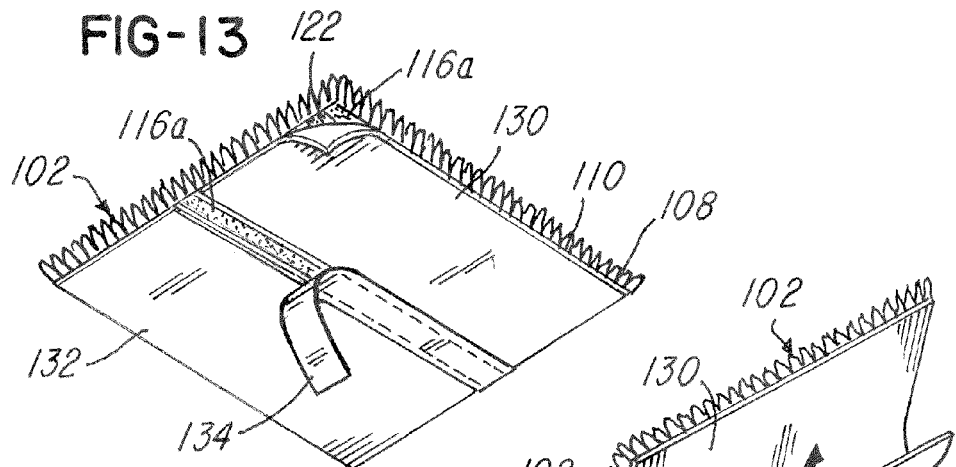
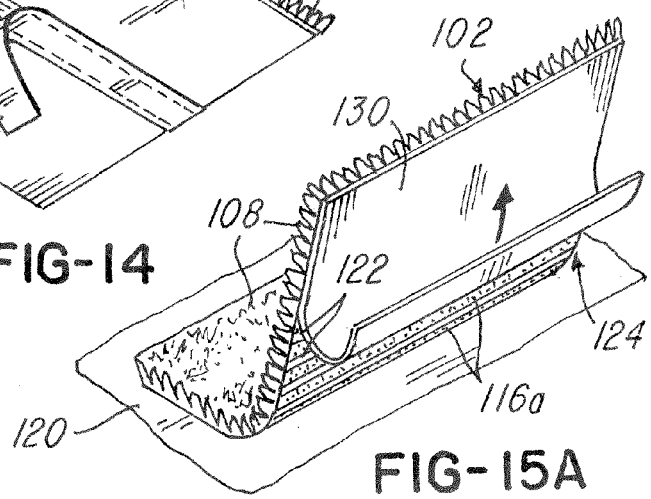
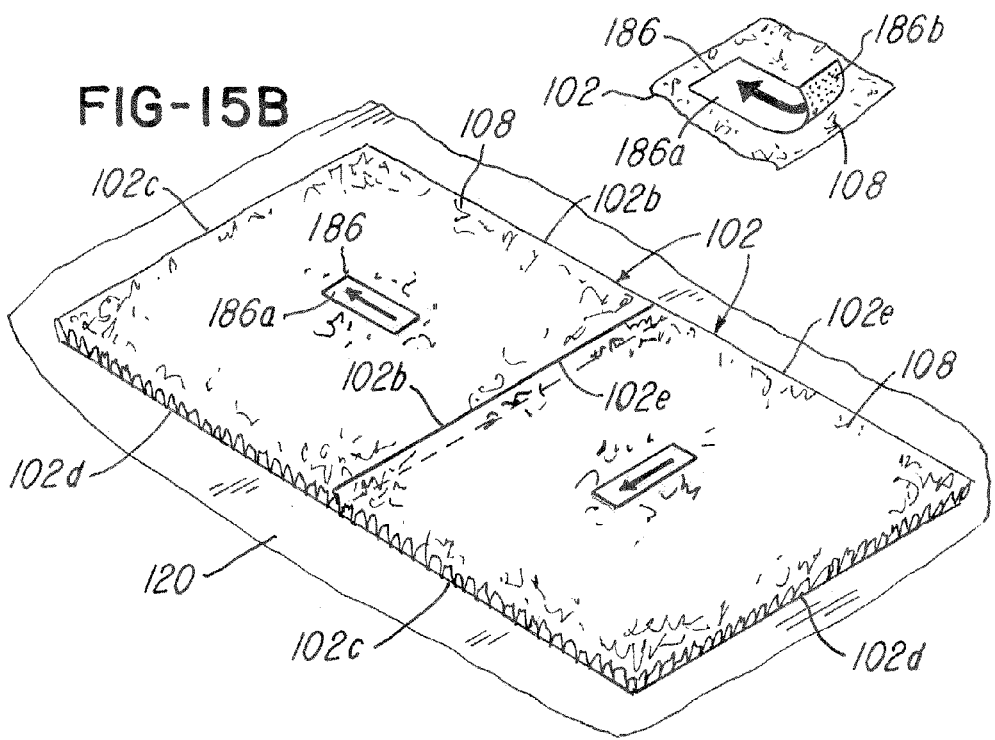

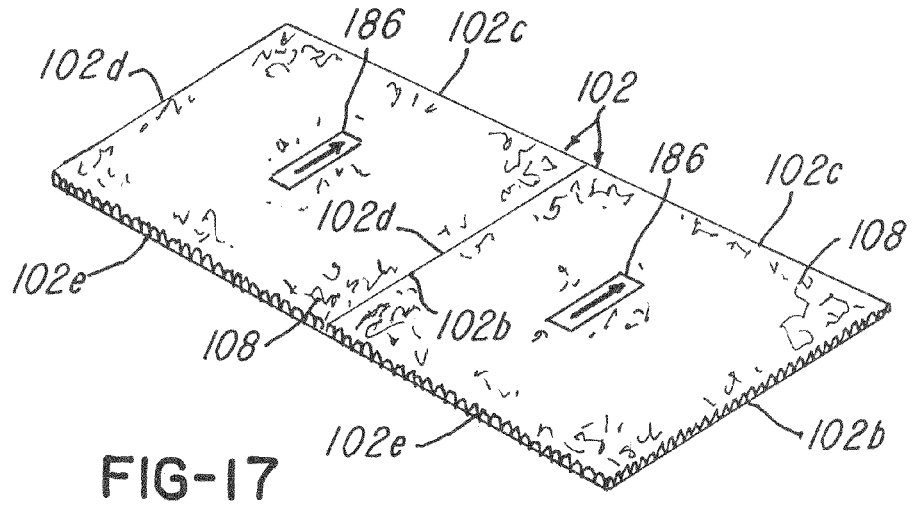
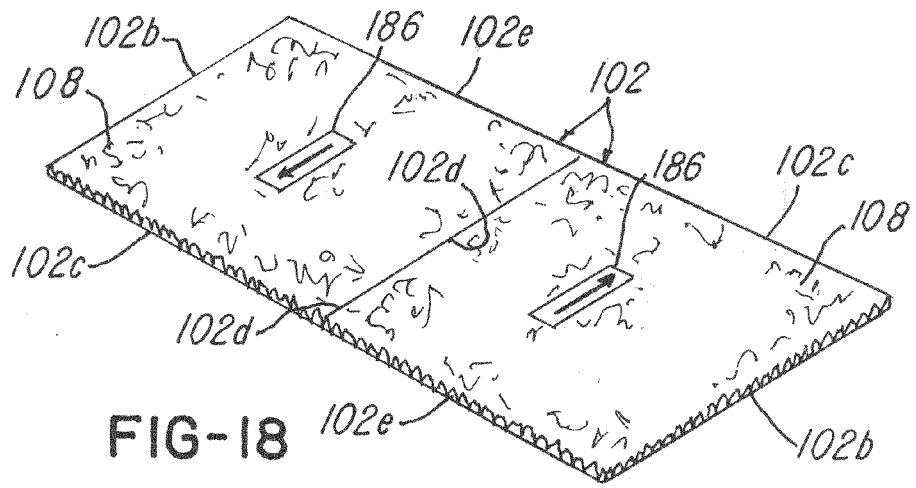
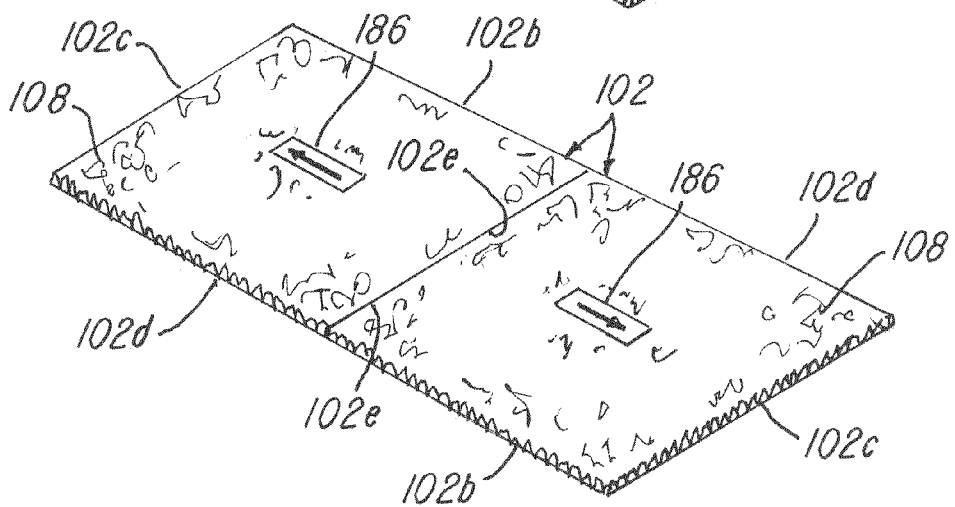

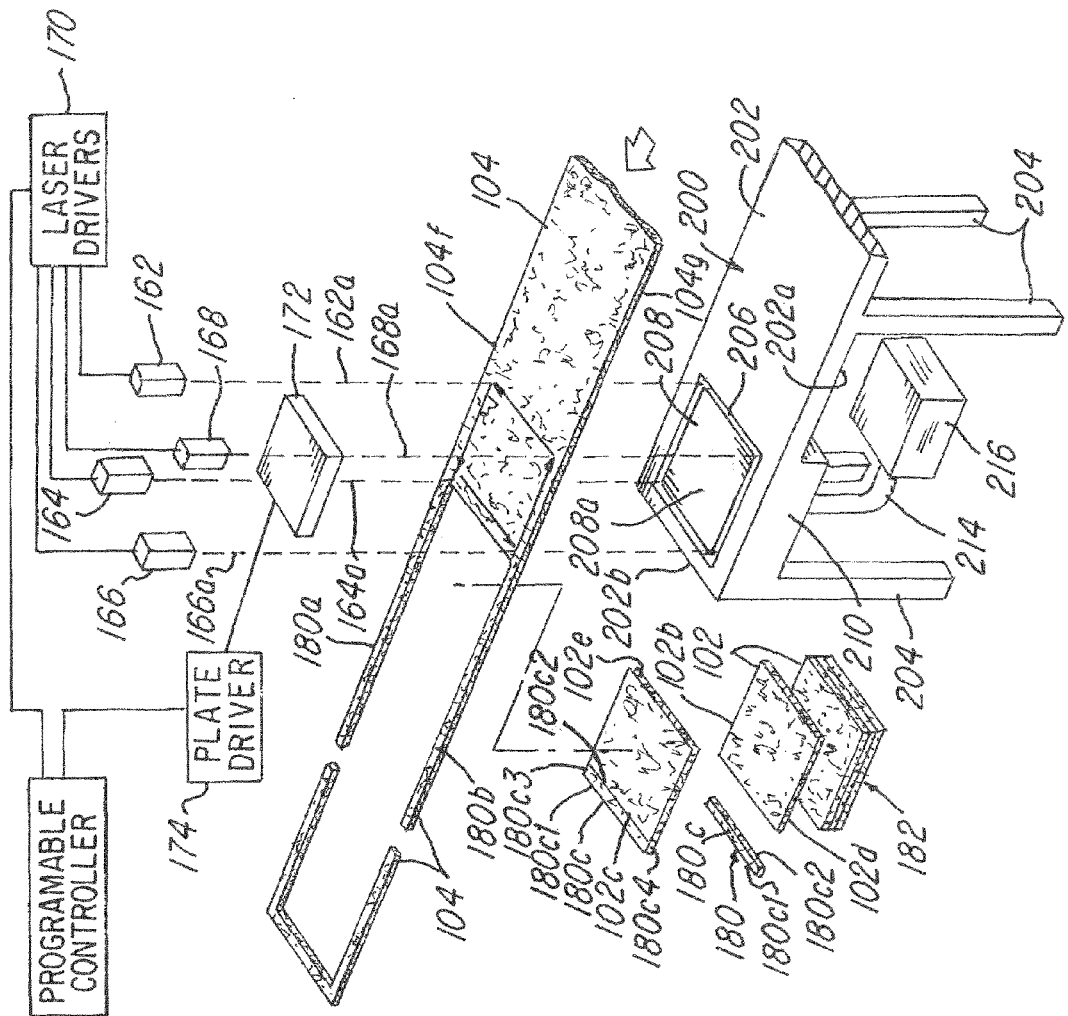

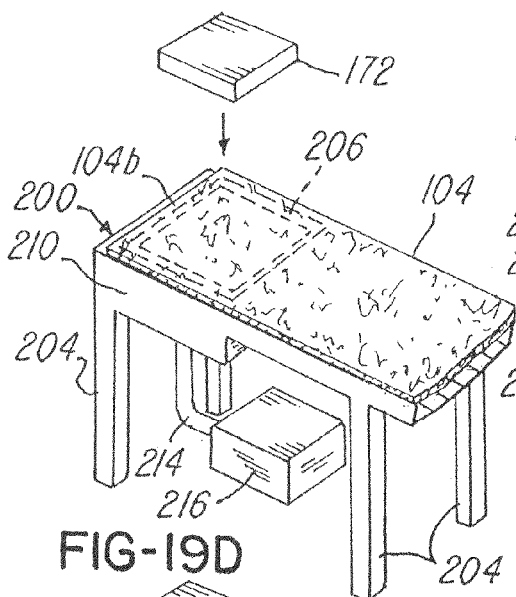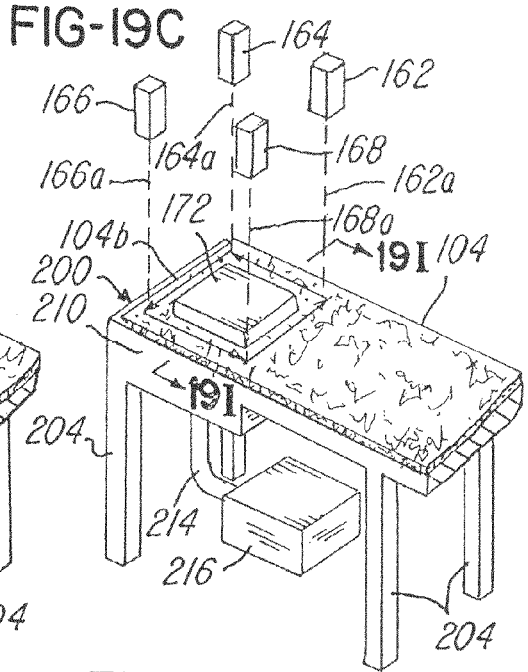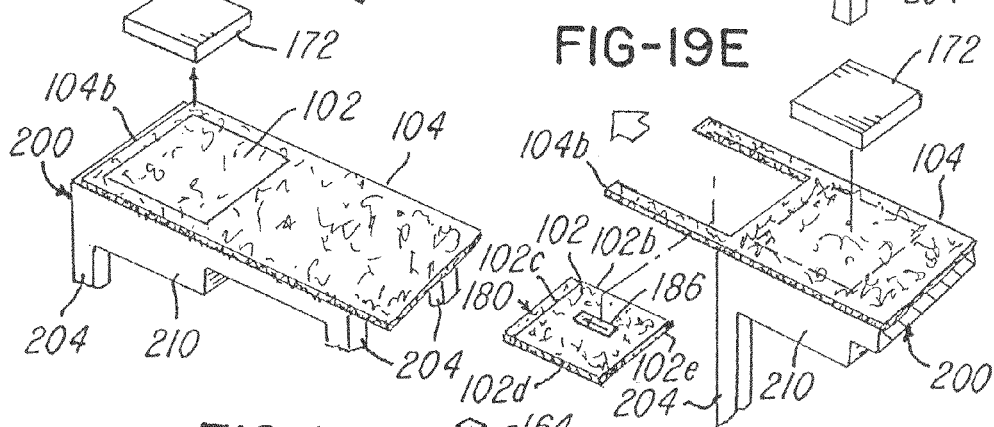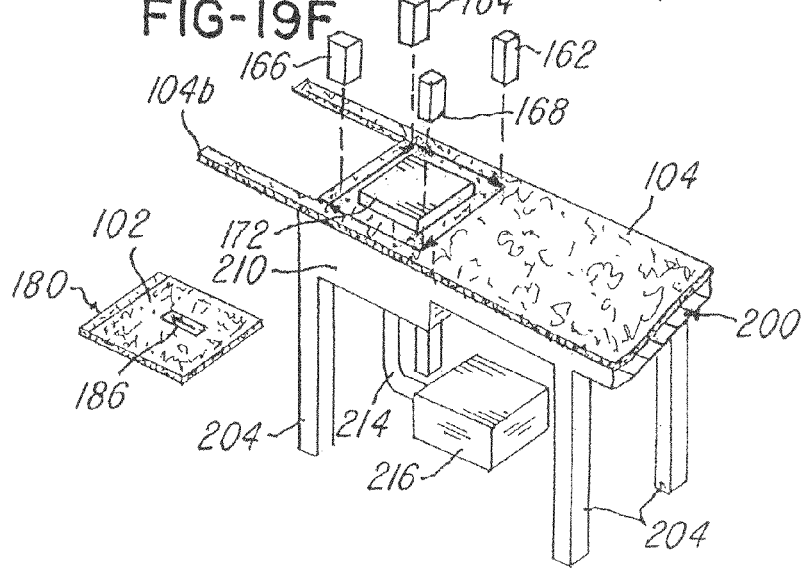

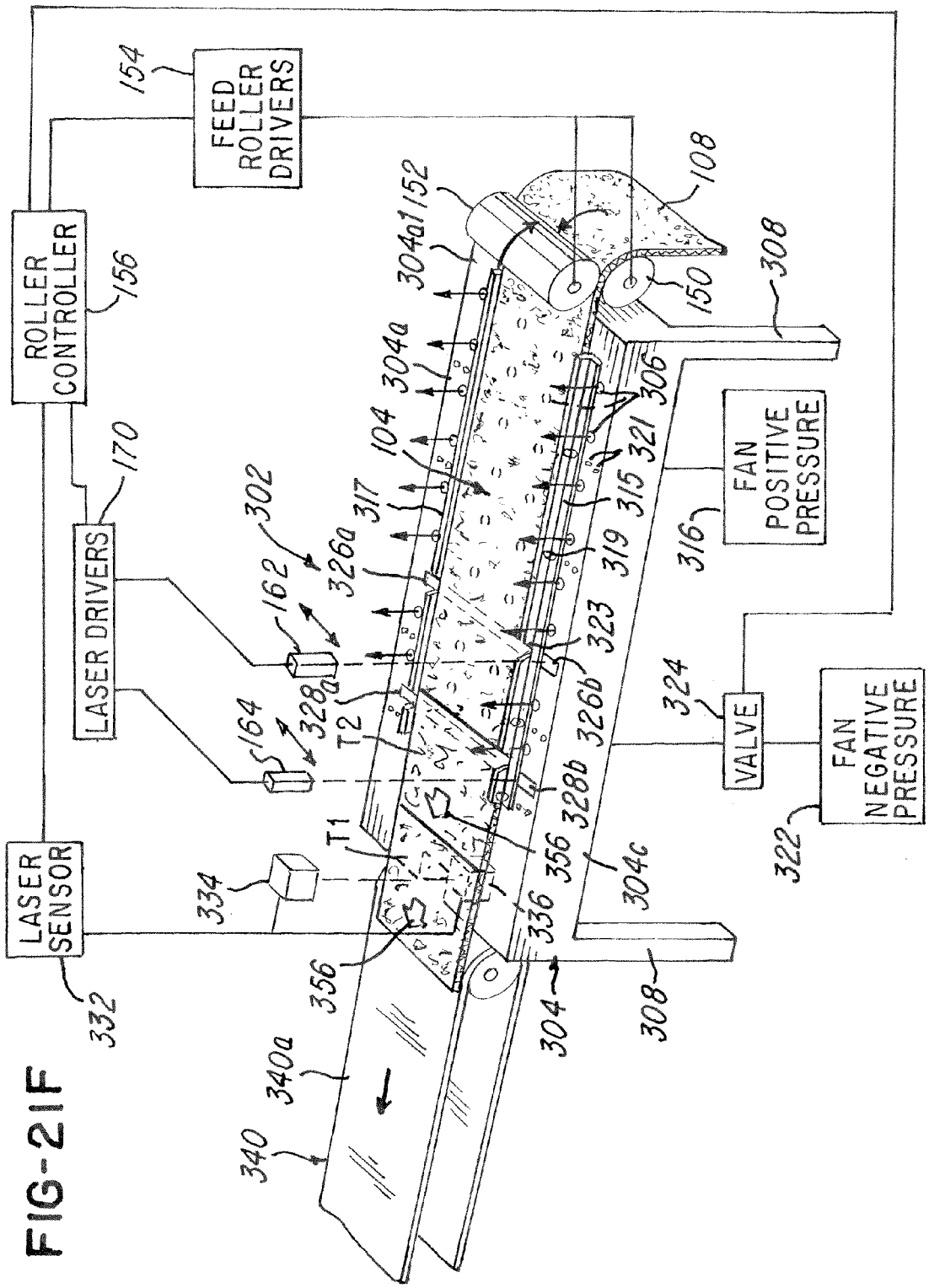

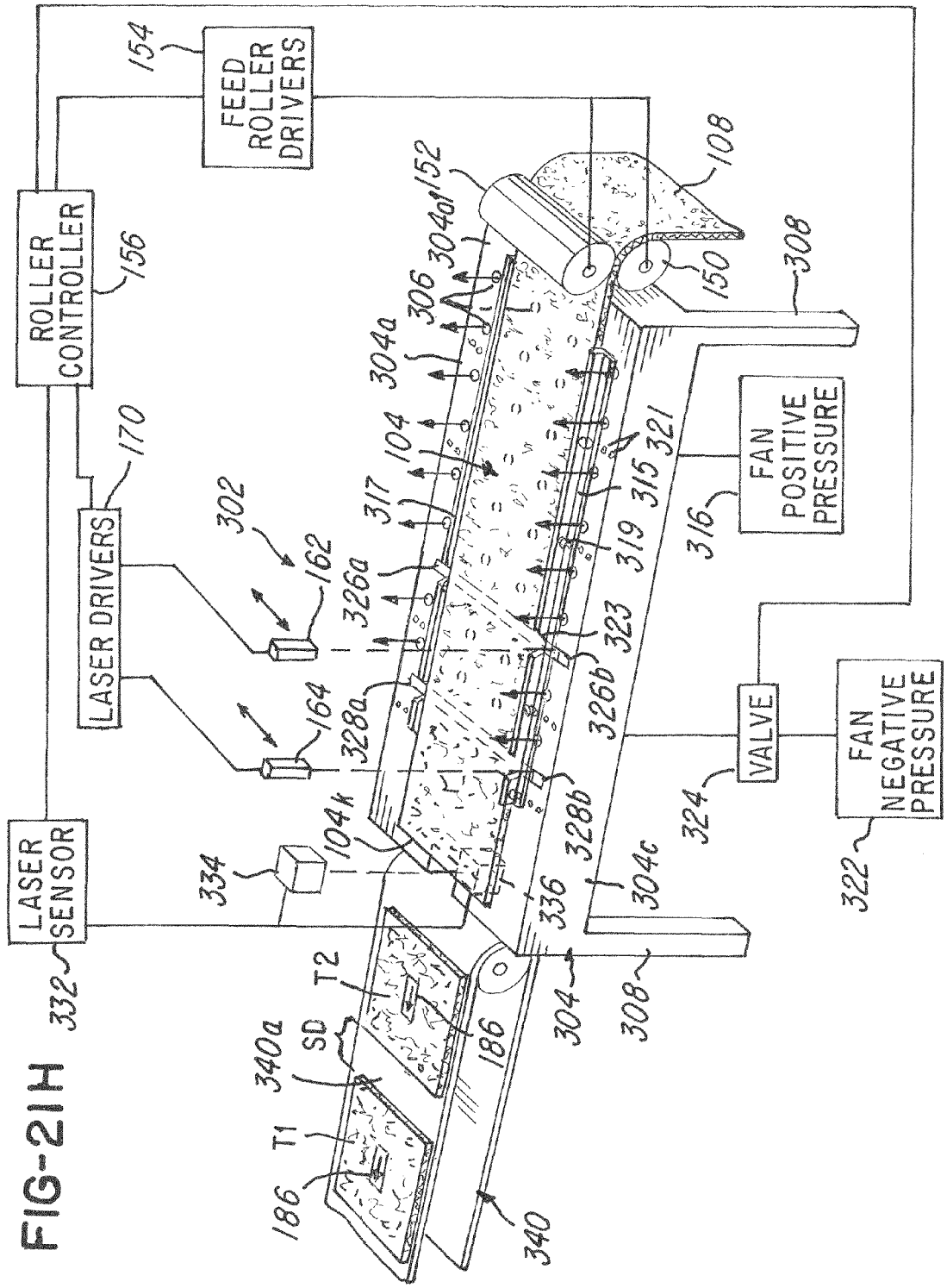

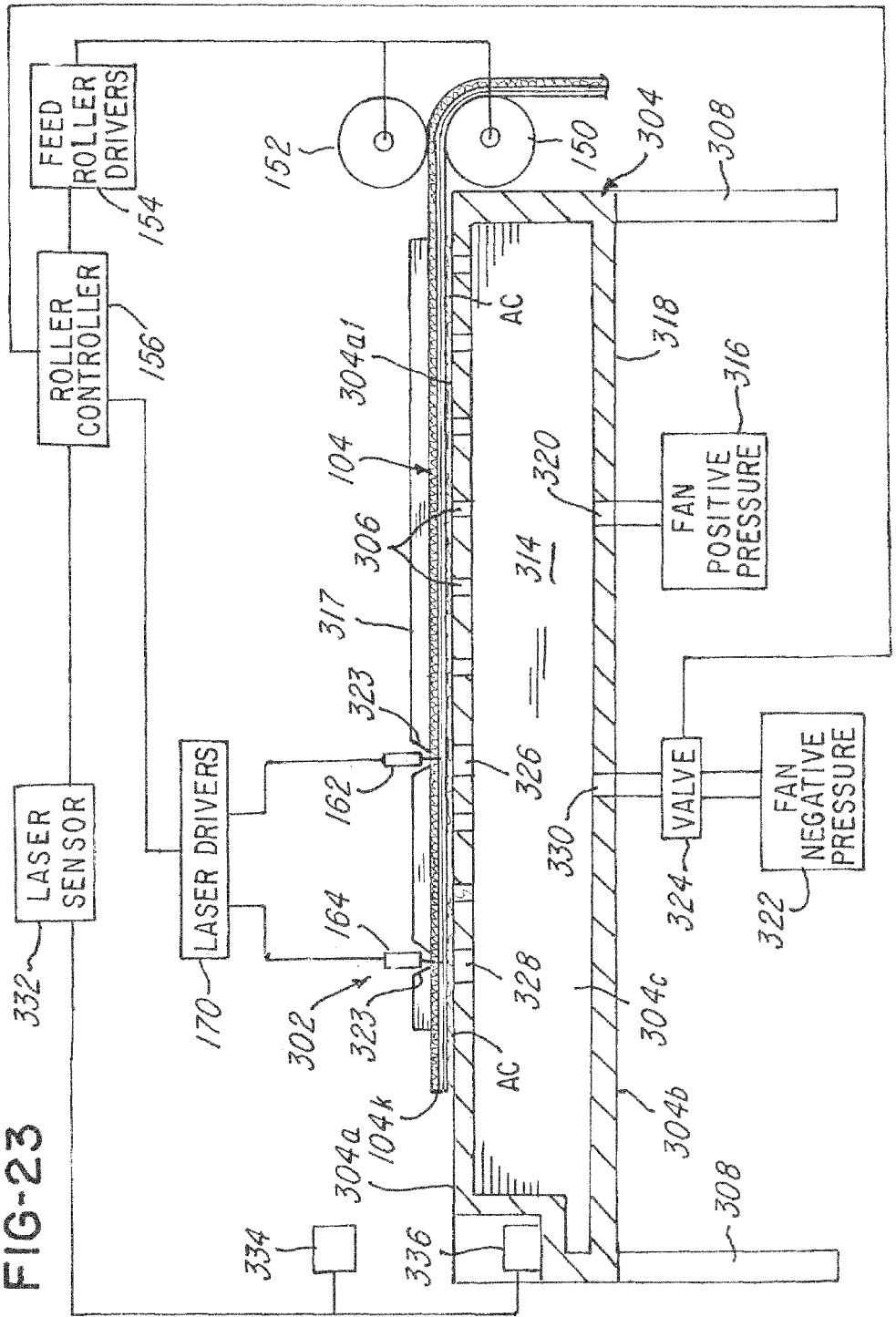

ized patent application Ser. No. 60/953,519 filed Aug. 2, 2007, to which Applicant claims the benefit of the earlier filing date. That application is incorporated herein by reference and made a part hereof.

COVERING OR TILE, SYSTEM AND METHOD FOR MANUFACTURING CARPET COVERINGS OR TILES, AND METHODS OF INSTALLING COVERINGS OR CARPET TILES

CROSS-REFERENCE TO RELATED APPLICATION

This patent application is related to provisional patent application Ser. No. 60/953,519 filed Aug. 2, 2007, to which Applicant claims the benefit of the earlier filing date. That application is incorporated herein by reference and made a part hereof.

BACKGROUND OF THE INVENTION

1. Field of the Invention

This invention relates to surface coverings for exterior or interior use. In particular, this invention relates to fibrous coverings suitable for use on solid surfaces, particularly on concrete, such as garage floors, patios or walkways.

2. Description of the Related Art

It is known to provide coverings, such as indoor/outdoor carpet, on walkways or patios to provide traction on potentially slippery surfaces and to cover unsightly surfaces. Due to the difficulty in affixing coverings to exterior surfaces that are irregular and exposed to the elements, most coverings are merely laid over the surface or tacked in place. However, this does not provide a secure covering and can slip or easily become displaced.

There has been an interest in designing garages that are more organized, attractive and comfortable in recent years. Typically, a garage floor is formed of concrete, which is difficult to keep clean, particularly dust free. Concrete is also a very hard and unforgiving surface to stand or work on. The problems with covering a garage floor involve providing a surface that can withstand typical uses, particularly vehicular traffic. Coverings merely laid over concrete cannot be driven on without bunching and slipping.

In the past, coverings were manufactured with a backing to which an adhesive or a double-sided adhesive tape was applied. Typically, the adhesive was applied to the entire backing, especially for very demanding traffic applications. The covering was then applied to a surface, such as a garage floor. It was extremely difficult to remove the covering from the surface, if, for example, the covering was damaged or otherwise needed to be removed.

Another problem with prior art coverings is that during installation, it was necessary to orient the coverings in a predetermined pattern or orientation. Some coverings had a release liner that covered the adhesive and the release liner had arrows or other indicia to assist the installer with installing the tile in the correct orientation. Unfortunately, even with such indicia, after the tiles are turned fabric side up the indicia cannot be seen and/or the orientation of the indicia gets lost relative to the tiles that are already situated on the surface that causes misplaced tiles or coverings. Unfortunately, because of the bond between the adhesive and the tiles, such tiles were difficult to remove and prolong the installation time.

Still another problem with prior art systems is that the covering was cut with contact cutters that did not provide for accurate cutting of the edges. Consequently, when such coverings were placed into a surface adjacent other coverings, they could not be properly fit and/or if fit would not look proper.

There is, therefore, a need for a system and method for making a covering product that is suitable for exterior or interior use, and particularly suitable for use in a garage that is subject to vehicular traffic and can withstand high loads and traction forces while remaining in place. There is also a need for providing a covering that is easy to install and maintain or repair if necessary.

SUMMARY OF THE INVENTION

Aspects of embodiments of the invention relate to a product that provides a durable covering for exterior and interior surfaces.

Another aspect of embodiments of the invention relates to a product that is easy to install and remains securely fastened to an underlying surface.

An additional aspect of embodiments of the invention relates to product that may be easily replaced and maintained.

This invention is directed to fibrous covering for outdoor or indoor use having an adhesive coating on the underside for adhesion to a surface, which can be a solid surface, such as a concrete patio, walkway, driveway or garage floor. It is contemplated that this covering can be applied to most solid surfaces, also including wood.

Aspects of the invention are directed to a covering to be installed on a surface, comprising a fibrous layer having a top fibrous surface, a bottom surface and a plurality of edges, an adhesive layer applied to the bottom surface of the fibrous layer, and a release sheet removably secured to the adhesive layer. The adhesive layer is formed in spaced bands, lines, strips or rows across the bottom surface. The release sheet includes at least one main sheet and a positioning sheet overlapping the main sheet for removal prior to the main sheet to expose only a portion of the adhesive layer. In one embodiment illustrated in FIGS. 1-7, the main sheet includes an overhanging edge that is folded over the edge of the fibrous layer and onto the top fibrous surface.

The invention is further directed to the covering in the form of a tile with a plurality of tiles assembled directly adjacent to each other.

The folded edge can be secured with a tab to the fibrous layer. The tab can include indicia for installing the tile in a particular orientation.

Aspects of the invention are also directed to a method of installing a covering on a surface comprising providing a plurality of pieces of covering, each piece formed as a tile made of a fibrous layer having a top fibrous surface, a bottom surface and a plurality of edges. An adhesive layer is applied to the bottom surface of the fibrous layer, wherein the adhesive layer is formed in spaced bands, lines, strips or rows across the bottom surface. A release sheet is removably secured to the adhesive layer, wherein the release sheet includes at least one main sheet and a positioning sheet overlapping the main sheet, wherein the main sheet includes an overhanging edge carrying positioning indicia that is folded over the edge of the fibrous layer and onto the top fibrous surface. The method includes positioning one of the tiles at a determined location on the surface using the positioning indicia on the folded edge of the main sheet, removing the positioning sheet to expose only a portion of the adhesive layer and tacking the tile at the desired location, and removing the main sheet to adhere the tile in the determined location. In accordance with the method, another tile is positioned at a determined location directly adjacent to the first tile, the positioning sheet of the second tile is removed to expose only a portion of the adhesive layer and tacking the tile at the desired location, and the main sheet is removed to adhere the tile in the determined location next to the first tile.

Other aspects of the invention are directed to a method of manufacturing a covering for installation on a surface comprising providing a strip of fibrous material having a top fibrous surface, a bottom surface and opposed edges, applying adhesive in an intermittent or spaced-apart pattern, spaced beads or strips on the bottom surface of the strip, applying a release sheet over the adhesive on the bottom surface of the strip, and separating the strip with the adhesive and release sheet thereon by a non-mechanical mechanism into individual pieces.

In one aspect, an embodiment of the invention provides a covering to be installed on a surface, comprising a fibrous layer having a top fibrous surface, a bottom surface and a plurality of edges, an adhesive layer applied to the bottom surface of the fibrous layer, wherein the adhesive layer is formed in spaced bands, lines, strips or rows across the bottom surface, and a release sheet removably secured to the adhesive layer, wherein the release sheet includes at least one main sheet and a positioning sheet overlapping the main sheet for removal prior to the main sheet to expose only a portion of the adhesive layer, wherein the main sheet includes an overhanging edge that is folded over the edge of the fibrous layer and onto the top fibrous surface.

In another aspect, another embodiment of the invention provides a method of installing a covering on a surface, comprising providing a plurality of pieces of covering, each piece formed as a tile made of a fibrous layer having a top fibrous surface, a bottom surface and a plurality of edges, an adhesive layer applied to the bottom surface of the fibrous layer, wherein the adhesive layer is formed in spaced bands, lines, strips or rows across the bottom surface, and a release sheet removably secured to the adhesive layer, wherein the release sheet includes at least one main sheet and a positioning sheet overlapping the main sheet, wherein the main sheet includes an overhanging edge carrying positioning indicia that is folded over the edge of the fibrous layer and onto the top fibrous surface, positioning one of the tiles at a determined location on the surface using the positioning indicia on the folded edge of the main sheet, removing the positioning sheet to expose only a portion of the adhesive layer and tacking the tile at the desired location, removing the main sheet to adhere the tile in the determined location, and positioning another tile at a determined location directly adjacent to the first tile, removing the positioning sheet of the second tile to expose only a portion of the adhesive layer and tacking the tile at the desired location, and removing the main sheet to adhere the tile in the determined location next to the first tile.

In still another aspect, an embodiment of the invention provides a method of manufacturing a covering for installation on a surface, comprising providing a strip of fibrous material having a top fibrous surface, a bottom surface and opposed edges, applying adhesive in an intermittent pattern on the bottom surface of the strip, applying a release sheet over the adhesive on the bottom surface of the strip, and separating the strip with the adhesive and release sheet thereon by a non-mechanical mechanism into individual pieces.

In still another aspect, an embodiment of the invention provides a covering to be installed on a surface, the covering comprising a fibrous layer having a top surface and a bottom surface and a plurality of edges, each of the plurality of edges being defined or created by a non-contact cut, an adhesive applied to the bottom surface of the fibrous layer, the adhesive being selected or applied to the bottom surface such that when the covering is removed from the surface, a majority of the adhesive layer is also removed from the surface.

In yet still another aspect, an embodiment of the invention provides a method of manufacturing a covering for installation on a surface, the method comprising the steps of applying adhesive to a web of fibers, pressing the adhesive into the web of fibers, and cutting the web of fibers into the covering having a predetermined shape without using a die cutter and after the applying adhesive step.

In still another aspect, an embodiment of the invention provides a covering for removably mounting on a surface, the covering comprising a plurality of tiles, each of the plurality of tiles comprising a nap and being removably mounted to the surface in a predetermined order, each of the plurality of tiles comprising a fibrous layer having a top surface and a bottom surface and a plurality of edges, each of the plurality of edges being defined by a non-contact cut, an adhesive applied to the bottom surface of the fibrous layer, the adhesive being selected or applied to the bottom surface such that when the covering is removed from the surface, a majority of the adhesive layer is also removed from the surface.

In still another aspect, an embodiment of the invention provides a covering to be installed on a surface, the covering comprising a fibrous layer having a top surface and a bottom surface and at least one edge, the at least one edge being defined by a non-contact cut, an adhesive applied to the bottom surface of the fibrous layer, the non-contact cut beginning in a cutting plane at the top surface and diverging away from the cutting plane as the cut extends from the top surface toward the bottom surface.

In yet still another aspect, an embodiment of the invention provides a system of manufacturing a covering for installation on a surface, the system comprising an application station for applying adhesive directly to a web of fibers, a pressing station for pressing the adhesive into the web of fibers, a cutting station for cutting the web of fibers into the covering having a predetermined shape without using a die cutter, and a plurality of rollers for driving the web among the application station, pressing station and cutting station.

In yet another aspect, an embodiment of the invention provides a method for cutting a covering or tile comprising the steps of positioning a web at a cutting station, and cutting the web with a non-contact cutter to provide the covering or tile, wherein the web is still during the cut and no external forces are applied to the web to perform the cut.

Separating the strip into pieces can include cutting the strip with a laser.

The method can further comprise the step of providing a roll of fibrous material and slitting the roll into the strip.

Applying the adhesive in an intermittent pattern can include applying rows of beads or strips of adhesive. The adhesive beads or strips can be pressed into the bottom surface to form the beads or strips into bands, lines, strips or rows. Applying the release sheet can include pressing the release sheet onto the bottom surface and thereby pressing the beads or strips of adhesive into the bottom surface and forming the beads or strips into bands, lines, strips or rows.

A further object of the invention is to provide a system and method that accurately cuts coverings or tiles by providing a non-contact cutter that will accurately cut edges within tighter tolerances than what could be achieved with contact cutters.

Another object is to provide a system and method for providing indicia that facilitates installing the covering or tile.

Still another object is to provide a system and method for applying an adhesive directly to fabric, without any backing or liner.

Yet another object is to provide a system, method and tile that achieves one or more of the objects or advantages described herein.

These and other objects and advantages of the invention will be apparent from the following description, the accompanying drawings and the appended claims.

BRIEF DESCRIPTION OF THE ACCOMPANYING DRAWINGS

The invention will now be described in conjunction with the accompanying drawings in which:

FIG. 4 is an enlarged side view in cross section of a carpet piece installed on a surface;

FIG. 5 is a bottom view of a carpet piece during manufacture;

FIG. 6 is a bottom view of a carpet piece during manufacture at a later stage than seen in FIG. 5;

FIG. 7 is a schematic view of a manufacturing process for making the carpet pieces in accordance with the invention;

FIG. 8A is an isometric view of a system and method for making a covering or tile in accordance with one embodiment;

FIG. 8B is an enlarged sectional view taken along line 8B-8B of FIG. 8A;

FIG. 8C is an enlarged sectional view similar to 8B, taken along the line 8C-8C of 8A, showing various details of a web after an adhesive and liner has been applied;

FIG. 9 is a fragmentary elevation view of an adhesive application and roller;

FIGS. 10, 11 and 12 are enlarged fragmentary elevation views showing diverging cuts and joining of adjacent coverings or tiles;

FIGS. 13 and 14 are isometric views showing a system and means for attaching the tile to a surface;

FIG. 15A is a fragmentary perspective view illustrating at least one removable label having an indicia for indicating a nap or pattern in the covering or tile;

FIGS. 15B-18 are isometric views of alternative arrangements of coverings or tiles in accordance with various embodiments of the invention;

FIGS. 19A-19H are various illustrations showing an operation of the process and system in accordance with another embodiment of the invention;

FIGS. 21A-21H are various views illustrating the method and system for cutting in accordance with the embodiment illustrated in FIG. 20;

FIG. 23 is a sectional view taken along the line 23-23 in FIG. 21A; and

In the drawings, like reference numerals indicate corresponding parts in the different figures.

DETAILED DESCRIPTION OF THE DRAWINGS

This invention is directed to a surface covering in the form of tiles, particularly suited for covering a solid exterior surface, such as a garage floor, an exterior environment, an environment subject to exposure to the elements, or an environment subject to heavy traffic and high loads. The invention is particularly suited for covering large expanses of exterior solid surfaces or surfaces subject to the elements or harsh conditions. The invention can also be used for covering other types of surfaces including, for example basement floors, factory floors, walkways or patios.

The tiles in accordance with the invention are particularly suited for connection to surfaces formed of concrete. Such surfaces can range from smooth to finished depending on the finish technique and wear. The invention may also be used on other exterior surfaces including concrete, synthetic composites, wooden boards, and plastic or plastic composite boards.

Figure 1:
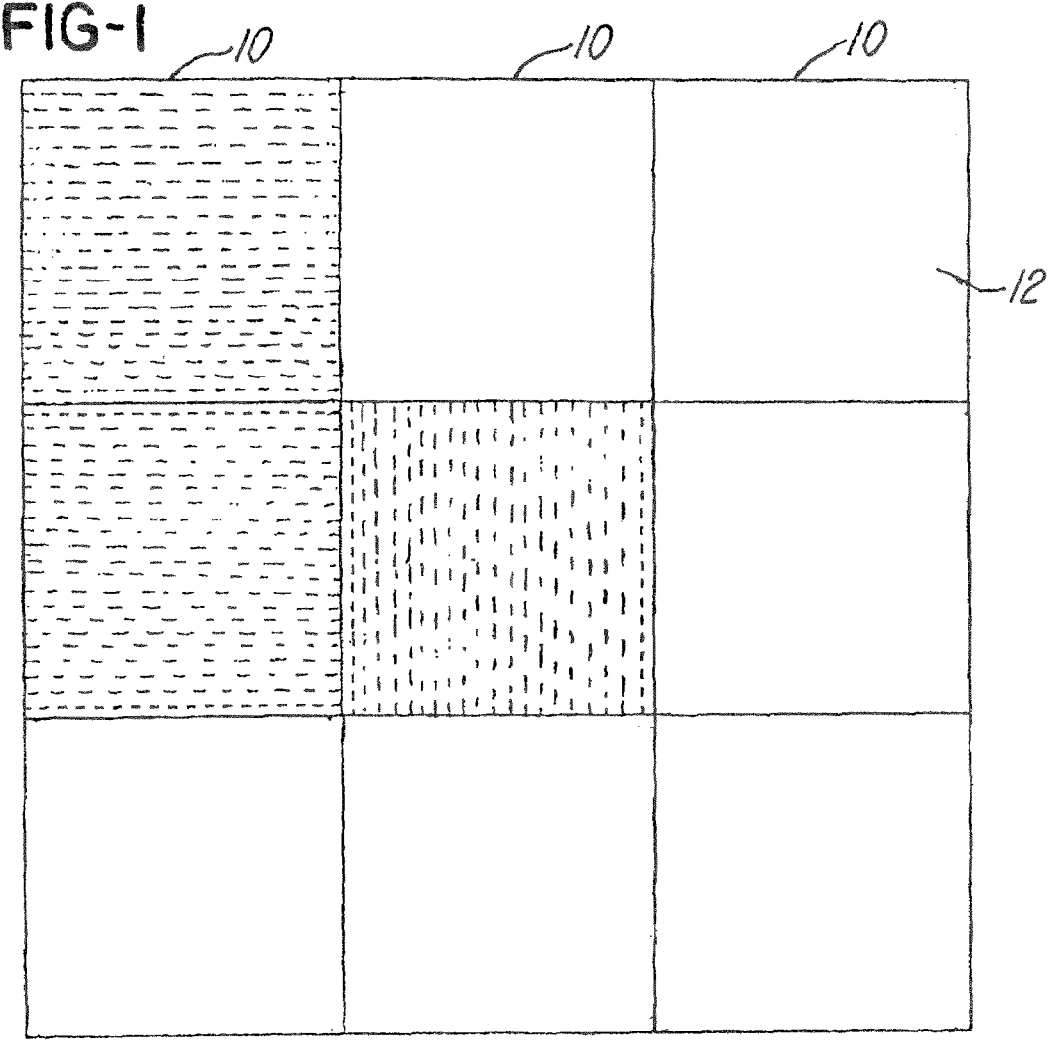
FIG. 1 is a top view of a plurality of carpet pieces in accordance with the invention installed on a surface.

Referring to FIG. 1, the covering in this form of the invention includes a plurality of carpet pieces or tiles 10 that are applied to a surface S to form a solid covering. Each carpet piece 10 is formed as a tile that can be affixed to an underlying surface. The tile may be any size or shape. In one preferred configuration, the tiles are square for easy installation and measure about 12 inches by 12 inches, 18 inches by 18 inches, 24 inches by 24 inches, 36 inches by 36 inches, or 48 inches by 48 inches.

Carpet piece 10 has a top layer or surface 12 preferably made of a fibrous material, such as carpet material, which provides a surface with good traction and appearance. The fibrous material can be manufactured in various forms, with one particularly desirable form forming a ribbed surface. A desirable weight of fibers would fall within the range 18-60 ounces per square yard. One useful weight for exterior high traffic areas is 28 ounces per square yard. A good range for durability is 22-40 ounces per square yard. It is preferred that the weight and form of the carpet surface 12 be resistant to compression and denting to avoid damage from parked vehicles, for example.

Preferably, the carpet material could be formed from any suitable material that can receive an adhesive and that can be cut subsequently with a non-contact cutter as described herein. Such material could be wool, nylon, polymer or other materials suitable for accommodating a traffic surface, such as a walking or rolling traffic surface and may be dispersed or combined with polypropylene carpet fibers. The dispersal of these fibers results in a firmer, more stable structure. Due to the improved structure, it is not necessary to use a backing, such as latex as is commonly used, but such backing could be used with the invention described herein. One problem with latex backings in a wet environment is that the foaming agent used during manufacturing becomes reactivated when wet, which causes the material to become slippery. If desired, UV treated fibers may be included in the mix to provide protection to the carpet piece 10 in installations exposed to sunlight. Of course, other materials may be used depending on the particular application, including for example polyester or other blends.

The underside of the top layer 12 forms a bottom layer or surface 14, which has adhesive applied directly thereto with no intermediate foam layer, as is common with interior use carpeting. Directly coating the adhesive onto the bottom surface 14 of the fibrous material forms an integral structure that adds to the durability. If it is desired to add an intermediate layer, to form a liquid barrier for example, an incompressible layer can be disposed over the bottom surface 14 of the fibrous layer.

The adhesive is applied to form narrow adhesive bands, lines, strips or rows 16, as seen in FIGS. 4 and 6. The process for forming the band 16 is described below. The adhesive bands, lines, strips or rows 16 are spaced across the entire width of the carpet piece 10 with free areas of the bottom surface 14 between each band 16. The adhesive bands, lines, strips or rows 16 allow the carpet piece 10 to be removed from the surface S when desired while still maintaining a secure connection to the surface. Preferably less than half, and most preferably about 25-30%, of the surface area of the bottom surface 14 is coated with the adhesive bands, lines, strips or rows 16. As seen in FIG. 4, the spaced bands, lines, strips or rows 16 form a discontinuous connection between the carpet piece 10 and the surface S, which allows the bond to be broken more easily when pulled free from the surface for repair or replacement.

The adhesive band 16 is preferably made of a removable adhesive (PSA) that is a hot melt, meaning it is applied at 100% solids. Suitable adhesive compositions are available from many different manufacturers and can be used as a hot melt adhesive. It may be desirable to use an adhesive band 16 that is water insoluble to resist deterioration due to the elements.

The viscosity of the adhesive band 16 may also be varied to affect penetration or wetting into the back surface of the fibrous layer. Lowering the viscosity, increases the wet-ability (tack) of the adhesive, thereby allowing it to penetrate deeper into the bottom surface 14. As would be appreciated by those of ordinary skill with adhesives, the viscosity of the adhesive will affect the coating weight.

Figure 2:
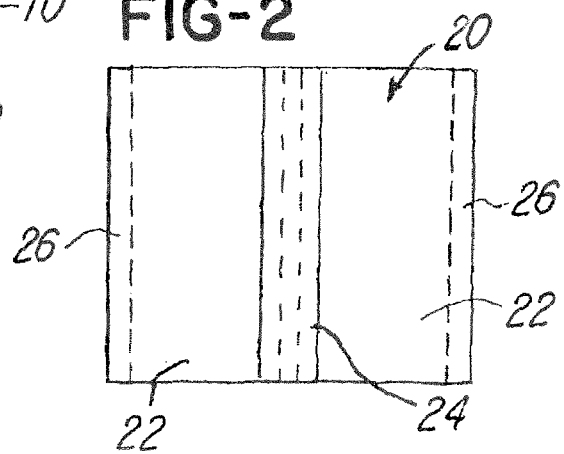
FIG. 2 is a bottom view of one of the carpet pieces of FIG. 1 before installation.

The bottom surface 14 with the adhesive bands, lines, strips or rows 16 is covered by a release sheet 20 that is removable upon installation. Referring to FIG. 2, the release sheet 20 is preferably formed as plural sheets, including, for example, two main sheets 22 and a positioning sheet or strip 24. The main sheets 22 are installed on the bottom surface 14 with a gap between, shown by the dashed lines in FIG. 2. The positioning sheet 24 is installed over the gap to overlap the main sheets 22. During installation, the positioning sheet 24 can be removed first to expose adhesive in the gap between the main sheets 22 to locate and tack the tile 10 in place prior to final placement. Of course, the sheets 22 and 24 can be any relative sizes or even a single sheet that tears apart.

Figure 3:
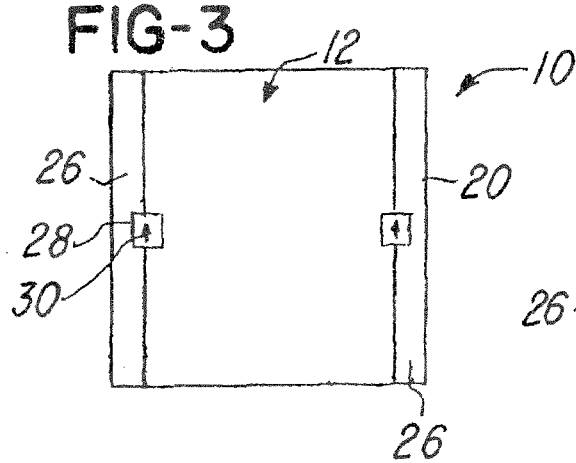
FIG. 3 is a top view of the carpet piece of FIG. 2.

Preferably, the main sheets 22 each have an edge 26 that extends outwardly from opposed sides of the tile 10. The edges 26 function as a gripping flange during installation for easy removal of the release sheet when the tile 10 is in the proper position. The edges 26 are folded over onto the fibrous surface 12, as seen in FIG. 3 for convenient packaging and easy access. The edges 26 can be secured by a tab 28 that also carries indicia 30 regarding the nap and/or instructions for installation. For example, the indicia 30 can indicate the direction of the pile so that the tiles 10 can be placed in an alternating configuration or an aligned configuration. Samples of both patterns are shown in FIG. 1. If desired, other portions of the release sheet can carry instructions or indicia, especially the positioning strip 24.

The release sheet 20 is removed during installation and discarded. The release sheet 20, which is also called a release liner, can be formed of any releasable sheet material that is easily pulled from the bottom surface 14. A suitable material is silicone coated polyester film or silicon coated paper. A preferred material is a silicone coated polyester sheet about ½-2 mils (0.0005 inch to 0.002 inch) thick. The important features of the release sheet 20 are that it releases reliably from the adhesive surface and avoids tearing so that it is easy for an installer to use, and it has the thermal stability to tolerate temperatures in the 300 degree Fahrenheit range.

The carpet pieces 10 can be installed on a surface S using the following procedure. First, the center of the surface S is located and marked with alignment marks such as two perpendicular lines or simply a straight edge. Then, the first tile is placed at the center mark. The positioning strip 24 is removed, and the carpet piece 10 is tacked in the desired position. The indicia 30 on the tabs 28 is used to properly orient the carpet piece 10. When the position is finally determined, the tabs 28 are released, and the main sheets 22 are removed by lifting each side of the carpet piece 10 leaving the center portion tacked in place. Each subsequent carpet piece 10 is installed in the same manner using the adhered carpet piece or carpet pieces 10 as a guide. The indicia 30 can be used to form a pattern as desired. It is also possible to form or print a pattern or design in or on the top surface 12 of the fibrous material, which can be repeated or pieced together during installation.

Due to the intermittent application of adhesive band 16, the connection between the carpet piece 10 and the surface S can be broken by applying an upward force to the carpet piece 10. By this, carpet pieces 10 may be selectively replaced. This provides for a longer life to the overall covering since damaged or worn pieces 10 may be replaced when necessary while leaving the remainder of the covering in tact. On the other hand, since the adhesive band 16 spans the entire width of the bottom surface 14, the carpet piece 10 is securely bonded to the surface S and resists shifting or bunching when a load is applied. For example, it is possible to drive a vehicle over the covering with no adverse affects.

Referring to FIG. 7, a technique for manufacturing the carpet pieces 10 is explained. The fibrous material is typically provided in a mill roll 40. The mill roll 40 is slit into strips 42, using a slitter or other conventional slitting mechanism, having the desired width for each carpet piece 10. A strip 42 is then fed with the bottom surface 14 facing up to an adhesive applying station 44 where in this illustration beads, rows or strips 46 of adhesive are deposited in a pattern of rows or lines across the width of the bottom surface 14. As illustrated relative to the embodiment shown in FIGS. 8A-15B, the preferred embodiment applies the adhesive in strips, lines or rows of adhesive, not beads, that become flattened and pressed into the web as described later herein. This is shown in FIG. 6.

The application techniques can vary depending on the particular adhesive composition, but one effective method is for the adhesive to be extruded and, if desired, treated with pressure and/or vacuum to enhance physical penetration of the fibrous bottom layer 14. Other suitable methods known to those of ordinary skill in the art are also possible, such as spraying, extrusion, or other methods of coating. It is preferred that hydrophobic adhesive be used to prevent water contaminating the bond between the adhesive and underlying surface.

At the next station 48, the release sheet 20 is applied to the bottom surface 14 to cover the adhesive beads or strips 46. The release sheet 20 is pressed onto the bottom surface 14, thereby flattening the beads or strips 46 and forming the bands, lines, strips or rows 16 of adhesive. This is shown in FIG. 6. This operation presses the adhesive into the bottom surface 14, which creates a stronger connection with the fibrous material, and causes the beads or strips to blend into bands, lines, strips or rows 16, which provides more secure adhesion to surface S during installation.

Application of the release sheet 20 is shown in a simplified form for purposes of explanation, but would include several nip rolls for applying each main sheet 22 and the overlapping positioning sheet 24. The release sheet 20 is pressed onto the bottom surface 14 with the edges 26 overhanging the edges of the strip 42. It is also possible to use multiple stations to press the adhesive beads or strips 46 into the surface and then apply the release sheet 20.

The strip 42 now carrying the adhesive bands, lines, strips or rows 16 and the release sheet 20 is fed to a separating station 50 where the strip 42 is separated into individual pieces 10. Due to the adhesive band 16 and the release sheet 20 formed into a composite strip, it is not possible to use a mechanical cutting mechanism to effectively and precisely separate the carpet pieces 10. In accordance with this invention, a transverse cut is made through the entire composite strip 42 by using non-mechanical means, such as a laser. It would also be possible to use other non-mechanical means, such as a water jet. The laser, in this case, provides an accurate and neat transverse cut to separate the strip 42 into carpet pieces 10.

In the embodiment illustrated in FIGS. 1-7, the overhanging edges 26 are then folded over the top surface 12 and attached with the tabs 28. It is also possible to merely crease the edges 26 so that they remain overlapped onto the top surface 12 without use of tabs 28 or even to leave them extending outwardly from the edges.

When packaged, it is preferred that the carpet pieces 10 are also alternated so that the sides of the tiles 10 that do not have the release sheet overlapping edge 26 are not aligned within a stack. As these sides have exposed adhesive edges it is desirable to space them apart with the release sheet edges 26 to avoid inadvertent sticking between stacked tiles 10.

Referring now to FIGS. 8A-19I, another embodiment of the invention is shown. This embodiment is also directed to a surface covering or overlay in the form of tiles, particularly suited for covering a solid surface, such as a floor, garage floor, patio, an exterior or interior environment, an environment subject to exposure to elements or an environment subject to heavy traffic and high loads, such as airports, retail stores and the like. This embodiment is particularly suited for covering large expanses of exterior or interior solid surfaces or surfaces subject to the elements, or harsh conditions. The invention can also be used for covering other types of surfaces including, but not limited to, basement floors, factory or retail floors, common areas, public areas, walkways or patios as mentioned earlier.

The tiles in accordance with this embodiment are particularly suited for connection to surfaces formed of concrete. Such surfaces must be smooth or finished. The embodiment may also be used on other exterior surfaces including concrete, synthetic composites, wood boards and plastic or plastic composite boards or any other suitable flat surface.

A key feature of this embodiment is that the coverings or tiles are manufactured in accordance with a system and method that provides an adhesive that is pressed directly into the surface of the fibers or the backing. In the embodiment being described herein, it should be understood that the fibrous layer is not supported with a backing or coating, but rather has an adhesive, described below, applied directly to the fibers and pressed therein relating to needle-punched products. It should be understood that the adhesive described herein is selected to provide a desired amount of bond between the covering and the surface area to be covered so that if it is desired to remove the covering from the surface it can be done by hand or with a simple tool, such as a pair of pliers. If desired, UV treated fibers may be included in the mix of fibers to make the covering or tile to provide protection to the covering or tile in installations exposed to sunlight. Of course, other materials may be used depending on the particular application, including for example polyester or other blends.

Referring now to FIG. 8A, a system 100 is provided for making a plurality of coverings or tiles 102, which in the illustration being described have a predetermined shape, such as square or substantially square, although it should be understood that the covering or tile 102 may be any size or shape. In one illustrative configuration, the covering or tile shape is square for easy installation and measure 18 inches by 18 inches, 12 inches by 12 inches, 24 inches by 24 inches, 48 inches by 48 inches, or 96 inches by 96 inches, but could be bigger or smaller if desired.

As with the embodiment described earlier herein, the carpet material that makes up the web 104 is formed from any suitable material that can receive an adhesive and that can be cut with a non-contact cutter as described herein. Such material could be wool, nylon, polyester, polypropylene or other materials suitable for accommodating a traffic surface, such as a walking or rolling traffic surface. The dispersion of these fibers results in a firmer, more stable structure. As mentioned earlier, it is not necessary to use a backing, such as latex as is commonly used in the past, but one could be used if desired. Of course, other materials may be used depending upon the particular application, including, for example, polyester or other blends.

Referring back to FIG. 8A, notice that the web 104 comprises the first or top surface 108 and a second or bottom surface 110. The system 100 comprises an application station 112 (FIGS. 8A and 9) comprising an adhesive applicator 114 that applies an adhesive 116 directly to the bottom surface 110 in strips, bands, rows or lines 116a. The invention may be used with an unbacked web 104 or with a web (not shown) that has an intermediate layer, backing or the like. In the embodiment being described, the web 104 is supported during non-contact cutting of the covering or tile 102, so no backing or support material on the web 104 is necessary to perform the cutting. As mentioned later herein, the system and method permit non-contact cutting of the web 104 after the adhesive 116 is applied, which cannot be done as efficiently or accurately with traditional contact cutters, such as cutters that used a knife, blade, die or jig.

As illustrated in FIG. 9, note that the adhesive applicator 114 applies adhesive 116 in strips, bands, rows or lines 116a directly to the bottom surface 110 of the web 104, which causes the adhesive 116 to form an integral structure with the fibrous material of the web 104 that adds to durability. The adhesive applicator 114 applies the adhesive 116 in strips, bands, rows or lines 116a that get pressed and "flattened" into flattened strips, lines, rows or bands 116a. It should also be understood that the bond between the fibrous material and the adhesive 116 is greater than the bond between the adhesive 116 and a surface 120 (FIG. 14) on which the covering or tile 102 is adhered or mounted, so that when the covering or tile 102 is pulled from the surface 120 in FIGS. 14 and 15B the bond between the adhesive 116 and the surface 120 will give way prior to the bond between the fibrous material and the adhesive 116. This facilitates removing the covering or tiles 102 after installation in a manner that causes a majority of the adhesive to be removed when the covering or tile 102 is removed from the surface 120.

If it is desired to add an intermediate layer (for example, to form a liquid barrier), an incompressible layer can be disposed over the bottom surface 110 of the fibrous layer or web 104.

Referring back to FIG. 8A, notice that the adhesive 116 is applied to the bottom surface 110 at the application station 112 in strips, lines, rows or bands that get pressed into flattened bands, lines, strips or rows 116a as they exit a pressing station 115 as shown. As with the embodiment described earlier, the adhesive bands, lines, strips or rows 116a are spaced across the width of the covering or tile 102 and across the bottom surface 110 of the web 104, with open or free areas 122 (FIG. 14) between the adhesive bands, lines, strips or rows 116a. The adhesive is not applied completely to the edge so that during cutting, the non-contact cutters do not have to cut through the adhesive. It should be understood that after the covering or tile 102 is situated on the surface 120, the areas between the adhesive bands, lines, strips or rows 116a and the surface 120 and area 122 defines a channel 124 which may facilitate directing fluid flow if desired.

As mentioned earlier, the adhesive bands, lines, strips or rows 116a allow the covering or tile 102 to be removed from the surface 120 when desired while maintaining a secure connection to the surface 120. Preferably, less than half and most preferably about 25-30% of the surface area of the bottom surface 110 is coated with the adhesive bands, lines, strips or rows 116a. Any amount of adhesive could be used to meet the demands of different applications. As with the embodiment described earlier, the spaced adhesive bands, lines, strips or rows 116a form a discontinuous connection between the covering or tile 102 and the surface 120, which, again, allows the bond to break more easily when the covering or tile is pulled from the surface for repair or replacement.

As with the embodiment described earlier, the adhesive 116 is preferably made of a removable pressure sensitive adhesive (PSA) that is a hot melt, meaning it is applied at 100% solids. Suitable adhesive compositions are available from many different manufacturers and can be used as a hot melt adhesive. The viscosity of the adhesive 116 may also be varied to affect penetration or wetting into the bottom surface 110 of the fibrous web 104. As would be appreciated by those of ordinary skill with adhesives, the viscosity of the adhesive will affect the coating weight.

The pressing station 115 comprises a plurality of nip rollers 126 and 128 that cooperate to press the adhesive 116 into the bottom surface 110. As illustrated in FIG. 8C, notice that the adhesive 116 is pressed into the bottom surface 110 and extends beyond a first plane P1 a predetermined distance. In the illustration being described, the predetermined distance may be at least ten-thousandth of an inch, and this may vary depending on the web material used. Moreover, the adhesive 116 may be applied at a basis weight of 50-200 gsm.

Note that the thickness D2 of the adhesive above the bottom surface 110 in plane P1 will typically be less than the distance D1 for a non-tufted material or application unsupported by web. For applications where the fibrous material is supported by a backing, the distance D1 will typically impregnate the backing to the top surface of the backing. In such an application, the distance D2 may be greater than the distance D1. Accordingly, it should be understood that the degree of adhesive penetration is largely dependent upon the porosity of the web 104 and the viscosity of the adhesive 116.

When the adhesive 116 is placed in adhesive bands, lines, strips or rows 116a on the bottom surface 110, it comprises a first, pre-pressed width W1 (FIG. 8B). After the adhesive bands, lines, strips or rows 116a are pressed into the bottom surface 110, the adhesive bands, lines, strips or rows 116a comprise a second width W2 (FIG. 8C), which is wider than the first width W1. In the illustration being described, the second width is less than one-quarter of an inch, but both widths W1 and W2 could be larger or smaller if desired. Thus, it should be understood that after the adhesive bands, lines, strips or rows 116a are pressed into the bottom surface 110 they become wider which provides more adhesive surface area for the adhesive 116 to bond to the surface 120 (FIGS. 14 and 15B).

Referring back to FIG. 8A, notice that at least one or a plurality of release liners, rolls or sheets 130,132 and 134 are provided at the pressing station 115, as illustrated in FIGS. 8A and 9. The bottom surface 110 with the adhesive bands, lines, strips or rows 116a is covered by the sheets 130-134 that are removable upon installation. As illustrated in FIGS. 8A and 9 and similar to the embodiment described earlier, a release sheet (FIGS. 13 and 14) is preferably provided or formed as one or from the plurality of sheets 130-134, including, for example, two main sheets 130 and 132 and the positioning sheet 134. The main sheets 130 and 132 are installed on the bottom surface 110 with a gap between them that exposes at least one or a part of one of the adhesive bands, lines, strips or rows 116a as illustrated in FIG. 13. The positioning sheet 134 is installed over the gap to overlap the main sheets 130 and 132, as illustrated in FIGS. 13 and 14. During installation, the positioning sheet 134 can be removed to expose a strip of adhesive bands, lines, strips or rows 116a in the gap between the main sheets 130 and 132 to locate and tack the covering or tile 102 in place prior to final placement. After the covering or tile 102 is finally placed in position, the main sheets 130 and 132 are removed and the covering or tile 102 is secured in place. As alluded to earlier, the release sheets 130, 132 and 134 could be provided in a single sheet that tears apart or has other areas that are removable to expose at least a portion of the adhesive bands, lines, strips or rows 116a.

The release liners 130,132 and 134 can be formed of any releasable sheet material that is easily pulled from the surface 120. A suitable material is silicone coated polyester film of the type described earlier herein with the previous embodiment. It is desirable to use release liners 130, 132 and 134 that can withstand the temperature of the adhesive when it is hot. As also mentioned earlier, other materials may be used, such as a silicon coated paper. A preferred material is a silicon coated sheet about one to two mils thick. For example, a silicon coated paper or silicon-coated polyester may be used, and a preferred material is a silicone coated polyester sheet about ½-2 mils (0.0005 inch to 0.002 inch) thick. The important features of the release sheets 130, 132 and 134 are that it releases reliably from the adhesive surface and avoids tearing so that it is easy for an installer to use and install.

Referring back to FIG. 8A, notice that the system 100 further comprises a transfer station 140 comprising a plurality of rollers 142, 144, 146, 148, 150 and 152 that are driven by at least one feed roller driver 154 that causes the web 104 to be moved through the system 100. As illustrated in FIG. 8A, the feed roller driver 154 is coupled to a roller controller 156 that in turn is coupled to various sensors 158. The sensors 158 are also coupled to a programmable controller 160 as shown. In the illustration being described, the feed roller driver 154 is programmable and drives the roller 150 to drive the web 104 a predetermined distance, which depends on the dimension of the covering or tile 102 being cut. For example, for an 18 inch by 18 inch square tile, the feed roller driver 154 drives the roller 150 to drive the web 104 in increments of approximately 18.25 inches.

The system 100 further comprises a cutting station 159 that has a cutting table or support 200 for supporting the web 104 during cutting at the cutting station 159. The cutting station 159 further comprises at least one or a plurality of drivable or moveable lasers or non-contact cutters 162, 164, 166 and 168 that are coupled to at least one or a plurality of drivers 170 that are mounted to a frame or support (not shown for ease of illustration) that supports the non-contact cutters 162, 164, 166 and 168 over the table or support 200 as shown.

Notice that the table or support 200 comprises a generally planar surface 202 that is supported by a plurality of legs 204. The surface 202 comprises a cutting aperture or opening 206 (FIGS. 8A, 19A and 19I) that generally corresponds to the predetermined shape to be cut into the web 104 for defining the covering or tile 102. Although the illustration shown shows the predetermined shape of the covering or tile 102, and consequently the cutting aperture 206, being generally square, it should be understood that the predetermined shape could be any desired shape.

The table or support 200 also comprises a second planar member or platen 208 (FIG. 19A) having a bottom surface 208a that is generally coplanar with the surface 202 to support the covering or tile 102 after it has been cut from the web 104. Note that a pan or reservoir 210 (FIGS. 8A, 19A-19H) is secured by conventional means, such as by a weld or with fasteners, to the underside 200a of the table or support 200. A pedestal support 212 (FIG. 19I) is secured to a bottom surface 210a of the pan or reservoir 210 and to a bottom surface 208a of the second planar member 208 to support the second planar member 208 in the position shown.

An exhaust conduit or tube 214 couples the pan or reservoir 210 to an exhaust fan 216 for exhausting air and gases resulting from the non-contact cutting from the pan or reservoir 210 to atmosphere.

Figure 19G:
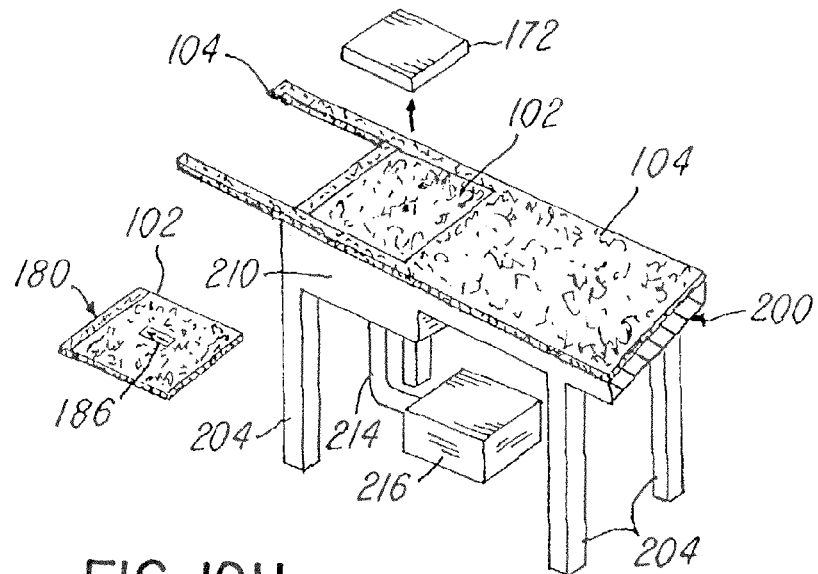

The laser or non-contact cutters 162-168 are coupled to and under the control of the programmable controller 160 (FIG. 19A). During cutting as described later herein, the programmable controller 160 causes the non-contact cutters 162-168 to generate laser beams 162a-168a to cut through the web 104, while the web 104 is in a resting position at the cutting station 159, to provide the covering or tile 102. In the illustration being described, the laser or non-contact cutters 162-168 are 180 Watt lasers manufactured by Coherent, Inc. of Santa Clara, Calif. Although not shown for ease of illustration, the laser or non-contact cutters 162-168 are mounted on a track, frame or gantry and the lasers 162-168 and the laser drivers 170 may comprise the laser system available from Kern Electronics & Lasers, Inc. of Wadena Minn. Moreover, as is known in the laser art, one or more mirrors (not shown) may be provided to facilitate adjustment of the laser beam to the optics lens. Notice that during cutting, the laser beams 162a-168a are received in the cutting aperture 206 in the table 200. The programmable controller 160 energizes the laser drivers 170 to drive the lasers 162-168 to cut the predetermined shape or pattern, and during such cutting, the laser beams 162a-168a are continuously received in the cutting aperture 206. Applicants have found that the cutting aperture 206 facilitates reducing or eliminating reflection of the laser beams 162a-168a as can occur if there is a reflective surface underneath the web 104 and in line with the laser beams 162a-168a. The cutting aperture 206, therefore, facilitates providing a clean cut of edges 102b, 102c, 102d and 102e (FIG. 8A) in the web 104 to provide the covering or tile 102. Further description of the system and process for cutting are provided later herein relative to FIGS. 19A-19I.

Advantageously, the non-contact cutting system utilizing at least one non-contact cutter, such as one or more of the moveable lasers 162, 164, 166 and 168. The laser cut(s) vaporizes the fibers along the edges that provide a "clean" and accurate cut at the edges 102b-102e.

The operation of the system 100 and method will be described relative to FIGS. 8A and FIGS. 19A-19I, which are simplified for ease of illustration. During operation, the programmable controller 160 and the roller controller 156 energizes the at least one or a plurality of feed roller drivers 154 to move the web 104 through the system 100 until an end 104b reaches a desired location (FIGS. 8A and 19B). The sensors 158 sense the position of the end 104b and of the lasers or non-contact cutters 162-168 and provide this information to the programmable controller 160 and the roller controller 156. When the end 104b reaches the desired position, at least one or a plurality of feed roller drivers 154 cause the at least one roller 142-152 to cease moving the web 104. At least a portion of the web 104 is now positioned at a cutting station 159, as illustrated in FIGS. 8A and 19B. Notice that the web 104 is not cut or held in place by mechanical means that would cause distortion or displacement, and the web 104 lies and rests generally flat at the cutting station 159. Because the web 104 is not being distorted or displaced during cutting, the web 104 can be cut very accurately and within tight tolerances.

After the web 104 is in the desired position at the cutting station 159 (FIG. 8A and 19B), the programmable controller 160 energizes a plate driver 174 to drive a plate 172 into engagement with the top surface 108 (FIG. 19A) and to hold the web 104 against a platen 208. The plate 172 engages the top surface 108 and gently secures the web 104 against the platen 208 during cutting as shown. It should be appreciated that the plate 172 holds the web 104 substantially flat during cutting; however, the plate 172 does not apply enough pressure on the web 104 to cause distortion or displacement of the material making up the web 104 while the web 104 is being held or cut. This facilitates accurately cutting the web 104 within tight tolerances. Next, the programmable controller 160 energizes the laser drivers 170 and the lasers or non-contact cutters 162-168 to cut into the top surface 108 of the web 104 in the desired predetermined shape or pattern. In the illustration being described, the predetermined shape of the covering or tile 102 is a square.

In the illustration being described, it should be understood that each of the edges 102b, 102c, 102d and 102e (FIGS. 8A and 19E) of the covering or tile 102 are cut with the laser beams of the 162a, 164a, 166a and 168a (FIG. 19C), respectively, of the lasers or non-contact cutters 162-168. As mentioned earlier, the laser beams 162a-168a are received in the cutting aperture 206 during cutting, and the exhaust fan 216 (FIG. 19A) exhausts any smoke or debris through the tube 214 to the atmosphere.

In the illustration being described, the lasers or non-contact cutters 162-168 are laser cutters, but they could be other types of non-contact cutters, such as water jets or the like. By non-contact cutting as described herein, there is no mechanical contact between the cutter and the web 104, as opposed to a traditional mechanical cut with a knife or blade. In the past, cutting a web with adhesive was difficult because the adhesive would contaminate the blade or knife. Thus, it should be understood that each of the edges 102b-102e defines a non-contact cut that were laser-cut by the lasers or non-contact cutters 162, 164, 166 and 168, respectively. The laser driver 170 drives the lasers or non-contact cutters 162-168 in a direction indicated by the arrows in FIGS. 8A and 19C, and the laser beams 162a-168a cut edges 102b-102e as the lasers or non-contact cutters 162-168 are driven by the laser drivers 170 over the bottom surface 110. Note in the illustration being described that the plurality of edges 102b-102e define substantially a 90 degree angle with respect to any adjacent edge and in the illustration in the being described, is cut within a tolerance of less than five-thousandths of an inch.

As previously mentioned, the web 104 is cut in a relaxed state, without tension, pressure, pulling, deformation or distortion of the web during cutting or the use of backing, which facilitates achieving a very accurate desired cut. The system and method enables the cutting of a web 104 that does not have a backing, but that does have a pre-applied adhesive 116 and release liner(s) 130-134. As mentioned earlier, this is difficult to do with contact cutters, such as a knife or blade, because of the tendency for the adhesive to stick to and contaminate the knife or blade.

As described herein, the system and method provide the non-contact cutter means and method that facilitates cutting any desired size and shape because the size and shape are not bound by the limitations of traditional mechanical cutting knives, blades, dies and jigs required with traditional contact cutters of the past. In the past, the displacement of the web that occurred as a result of the cutting, knives, blades, dies and jigs used during contact cutting had to be accounted for in the final cut product because of cupping and curling problems encountered while the material was being held and/or cut. Advantageously, the embodiments described herein utilize at least one non-contact cutter, such as the moveable lasers 162-168, that eliminates the need to use the dies, jigs and contact cutters, like knives and blades, that caused pressure on the web or that resulted in undesired displacement of the material during the cut. As illustrated and described herein, the system and method utilize at least one non-contact cutter, 162-168, and no knives, blades, jigs or dies on the web 104 to apply a cutting pressure on the web 104 during cutting. This reduces or eliminates displacement of the material making up the web 104, which in turn provides coverings or tiles 102 that can be cut within tight tolerances.

Notice as illustrated in FIGS. 10-12, that each of the non-contact cuts diverge (as viewed in cross section) away from a cutting plane or line 171 (FIG. 10). This provides a beveled undercut as illustrated in FIG. 11. Although not shown, at least one of the lasers 162-168 could be positioned at a desired angle relative to the web 104 to create the angled or beveled cut. FIG. 10 shows the laser or non-contact cutter 168 generating the laser beam 168a that cuts the top surface 108. As the laser beams 166a and 168a cut through the bottom surface 110 and toward the top surface 108, the laser beams 166a and 168a diverge away from the cutting line 171 to provide an edge 102c and 102e that is generally not perpendicular to either the top surface 108 or the bottom surface 110. Thus, it should be understood that each laser cut through the web 104 diffuses or diverges away from the cutting line 171 as the cut extends away from cutting plane 171 as it extends from the top surface 108 toward the bottom surface 110 when viewed in cross section. Each of the edges 102e and 102c, as well as the edges 102b and 102d, define a beveled cut or an acute angle relative to the cutting line 171.

Referring to FIGS. 11 and 12, the inventor has found that the diverging cut mentioned earlier along the edges 102b-102e provides a very tight seam between adjacent coverings or tiles 102 when the separate covering or tile 102 are placed adjacent each other during installation, as illustrated in FIGS. 11 and 12. The fibrous materials at the edges, such as 102c and 102e, engage each other and the fibers at the edges become bunched and/or compressed to provide the tight seam as shown in FIG. 12. This facilitates providing a tiling system that provides a "tight" seam between adjacent coverings or tiles 102 if desired.

Figure 19H:
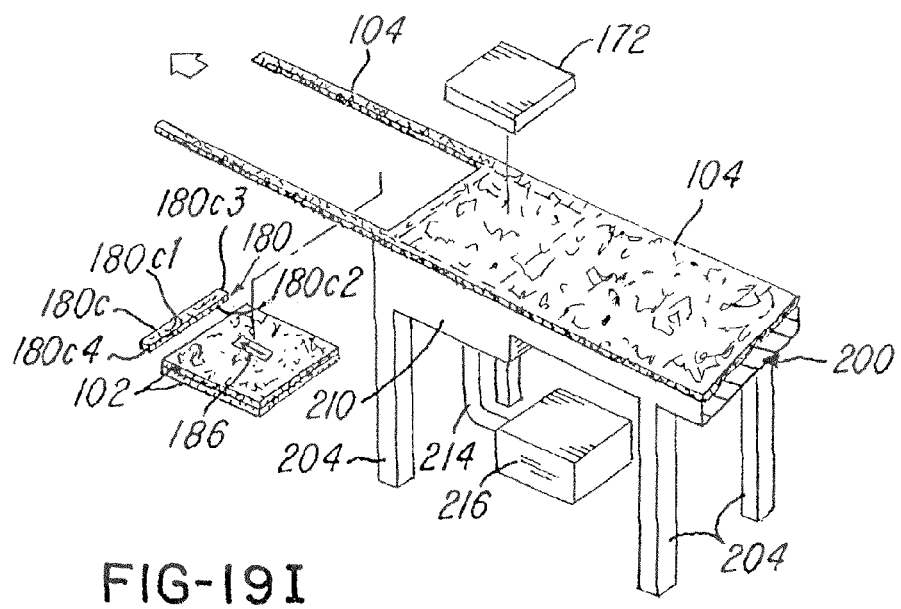
Figure 19I:
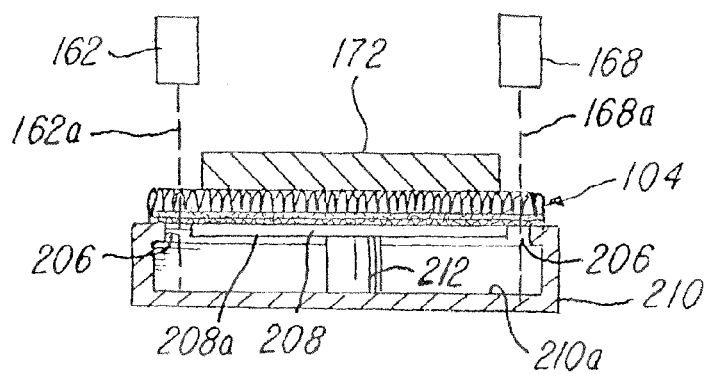
FIG. 19I is a cross-sectional view, taken along the line 19I-19I in FIG. 19C showing various details of a cutting table and cutting aperture.

Returning to the illustration in FIGS. 8A and 19A-19H, after the lasers or non-contact cutters 162-168 are finished cutting the covering or tile 102, the programmable controller 160 ceases energizing the lasers or non-contact cutters 162-168 and causes the laser drivers 170 to cease moving them. The programmable controller 160 then energizes the plate driver 174 to raise the plate 172 (FIG. 19D). The roller controller 156 energizes the feed roller drivers 154 to drive, advance or increment the web 104 (FIG. 19E) so that the next covering or tile 102 can be cut, as illustrated in FIGS. 19F-19H).

Notice that the cut edge 180c1 (19H) of scrap piece 180c drives the edge 102e of the previously cut covering or tile 102 toward a storing station 182 where the coverings or tiles 102 are stacked for storing or packing. When the next covering or tile 102 is to be cut (FIG. 19E), the roller controller 156 energizes the feed roller drivers 154 to increment the web 104 so that another covering or tile 102 can be cut. After the web 104 is incremented, the plate 172 is then caused to engage the web 104 (FIG. 19F). Programmable controller 160 energizes the laser drivers 170 to drive the lasers or non-contact cutters 162-168 (FIG. 19F) in the direction (i.e., back to their previous position) opposite that indicated by the arrow shown in FIGS. 8A and 19C. Accordingly, it should be understood that the laser drivers 170 move or drive the lasers or non-contact cutters 162-168 back and forth in one linear plane in the illustration being described to cut the plurality of coverings or tiles 102. After cutting, the plate 172 is again raised (FIG. 19G) and the web 104 is again advanced (FIG. 19H) so that the next covering or tile 102 can be cut. The process repeats until the desired number of coverings or tiles 102 are cut.

It is to be noted that during each cutting, the lasers or non-contact cutters 162-168 cut slightly beyond each adjacent edge in order to provide a clean and accurate cut. In this regard, the moveable lasers 162 and 166 cut through the web 104 and beyond the edges 102c and 102e until they meet with the cut-out edges 102c and 102e of the preceding cut. In contrast, notice that the moveable lasers 164 and 168 do not cut entirely through side edges 104f and 104g (FIG. 19A) of the web 104. Note that the side scrap pieces (that is, the scrap pieces 180a and 180b (FIG. 19A) resulting from the cut of edges 102b and 102d, respectively) remain attached to the scrap pieces 180a and 180b, respectively, of any preceding or succeeding cut to provide a continuous length of scrap. In contrast, an individual scrap piece 180 is created as well. In this regard, notice that the scrap piece 180c has an edge 180c1 corresponding to the cut of edge 102e by laser beam 164a, an edge 180c2 corresponding to the cut of edge 102c by laser beam 166a, and edges 180c3 and 180c4 created by moveable lasers 162 and 166, respectively. It has been found that this scrap piece 180c either falls from the cut covering or tile 102 by gravity after it clears an end 202b of the table or surface 202, or the scrap piece 180c may remain with the cut covering or tile 102 because of the adhesive 116. If the piece remains, an operator may simply pull the piece off and discard or recycle it.

It should also be understood that the system 100 could use a single high-speed laser cutter that could effectively cut all edges, such as the four edges in the illustration, if desired. Alternatively, a plurality of laser cutters, such as the plurality of lasers or non-contact cutters 162-168, or some smaller or larger number of laser cutters may be used if desired.

Advantageously, the inventor has found that by using the lasers or non-contact cutters 162-168 to cut the edges 102b-102d, very tight tolerances in cuts and shapes of cuts can be achieved. By cutting all the edges 102b-102e with at least one or a plurality of non-contact cutters, such as with a laser, tighter tolerances than the past can be achieved and the web 104 can be cut after the adhesive is applied. In the illustration, a square is cut within a tolerance of five-thousandths of an inch. Also, notice that the web 104 is cut after the adhesive 116 and release liner(s) 130-134 is applied, and the system and method cut all three simultaneously as shown and described.

Referring back to FIG. 8A, the system 100 may further comprise a removable label applying station 184 for applying a removable label 186 (FIGS. 8A and 15A) to the top surface 108 of the covering or tile 102 as best illustrated in FIG. 15A. Notice that the removable label 186 comprises a first side 186a and a second side 186b. A portion of the second side 186b may have a removable adhesive and also a portion or area of the second side 186b may have no removable adhesive to facilitate grabbing and removing the removable label 186 from the top surface 108.

Importantly, notice that the first side 186a comprises an indicia, such as an arrow, that provides an indication of the direction of the nap of the fibers that make up the web 104. Although in the embodiment being described, the at least one removable label 186 may indicate a direction of the nap, they may also be placed to indicate a pattern, an opposite direction or some other direction that may facilitate installation of a plurality of coverings or tiles 102 onto the surface 120. In some installations, it may be desired or necessary to arrange the coverings or tiles 102 in a predetermined order or pattern to have a design pattern (not shown) or nap of the coverings or tiles 102 facing the same direction, as illustrated in FIG. 16, situated in the direction illustration in FIG. 17, situated in opposite directions as shown in FIG. 18, or perhaps in a perpendicular direction as shown in FIG. 15A. An important point is that at least one removable label 186 provides indicia for the user to use while installing a plurality of the coverings or tiles 102 onto the surface 120 which facilitates quick and proper installation in a predetermined or desired pattern. It has been found that having the at least one removable label 186 situated on the top surface 108 of each covering or tile 102 provides quick and easy means or indicia for the installer to correctly position and orient the covering or tile 102.

After the at least one of removable label 186 is situated on the top surface 108 of each covering or tile 102, the scrap piece 180c may be removed (FIG. 19H) from the covering or tile 102 if it remains therewith. The covering or tile 102 may be packaged for distribution or further processing. An inventory of, for example, five or more coverings or tiles 102 may be situated in a box or other packaging, as described earlier, and shipped for further processing, distribution or sale.

Contrary to the embodiment described earlier herein relative to the embodiment shown In FIGS. 1-7, notice that the coverings or tiles 102 are provided in cleanly cut squares, without any overhanging release liners 130,132 and 134. In the embodiment of FIGS. 8A-19I, the release liners 130 and 132 do not extend beyond edges 102b and 102d because all release liners 130,132 and 134 and adhesive 116 are cut when the edges 102c and 102e are cut by the laser or non-contact cutters 162 and 168 during the cutting of the web 104, unlike the embodiment described relative to FIGS. 1-7 which utilized indicia 30 on the tabs 28 for proper orientation of the covering or tile 102.

As with the embodiment described earlier herein, during installation, the release sheet 134 is removed and discarded (FIG. 13), and the covering or tile 102 is tacked into place. When the position of the covering or tile 102 is properly positioned on the surface 120, the other release liners 130 and 132 are removed by lifting each side of the top surface 108, as illustrated in FIG. 14, leaving the center portion of the covering or tile 102 tacked in place. Each subsequent covering or tile 102 is installed (FIGS. 15B-18) and the adhered coverings and tiles 102 are used as a guide as well as using the indicia on the at least one removable label 186 as a guide. Because the adhesive 116 is applied in the adhesive bands, lines, strips or rows 116a and does not entirely cover the bottom surface 110, the bond or connection between the bottom surface 110 and the surface 120 can be broken by applying an upward force (as viewed in FIG. 15B) to the covering or tile 102. As mentioned earlier, because of the difference in bond strength, the adhesive 116 is pulled from the surface 120 and a majority of it remains with the covering or tile 102, rather than adhering to the surface 120 which is a significant improvement over the prior art.

This feature also enables covering or tiles 102 to be selectively replaced. As with the embodiment described earlier, this feature provides for a longer life to the overall surface covering because damaged or worn pieces may be replaced while leaving the remainder of the coverings or tiles 102 in tact. Because the adhesive 116 spans the entire width of the bottom surface 110, the covering or tile 102 is securely bonded to the surface 120 and resists shifting or bunching when a load is applied, such as when a vehicle rides over it.

Referring now to FIGS. 20-24, another embodiment of the invention is shown. This embodiment is also directed to a surface covering or overlay in the form of tiles, particularly suited for covering a solid surface, such as a floor, garage floor, patio, an interior or exterior environment, an environment subject to exposure to elements or an environment subject to heavy traffic and high loads, such as airports, retail stores and the like. This embodiment is particularly suited for covering large expanses of exterior or interior solid surfaces or surfaces subject to the elements or harsh conditions. The embodiment can also be used for covering other types of surfaces including, but not limited to, basement floors, factory or retail floors, common areas, public areas, walkways or patios as mentioned earlier.

As with the other embodiments, the tiles in accordance with this embodiment are also suited for connection to surfaces formed of concrete. This embodiment may also be used on other exterior surfaces including concrete, synthetic composites, wood boards and plastic or plastic composite boards or any other suitable flat surface.

A feature of this embodiment is that it utilizes the same system and method for providing an adhesive that is pressed directly into the surface of the fibers of the backing. In this embodiment, the web 104 could be provided with or without a backing or coating, but it could have an adhesive, described earlier herein, applied directly to the fibers and pressed therein. As with the embodiment described earlier, this feature facilitates using the system and method with needle-punched products or webs. It should be understood that the adhesive described herein is selected to provide a desired amount of bond as described earlier herein.

Accordingly, those parts in FIGS. 20-24 that bear the same part number as the parts identified relative to the prior embodiments identify the same or substantially the same part.

In the embodiment of FIGS. 20-24, another system and method 300 is shown for applying adhesive and release liners to the web 104 in the manner described earlier herein and then presenting the web 104 to a cutting station 302 (FIGS. 20 and 23) and cutting the web 104 in the matter described herein.

Figure 20:
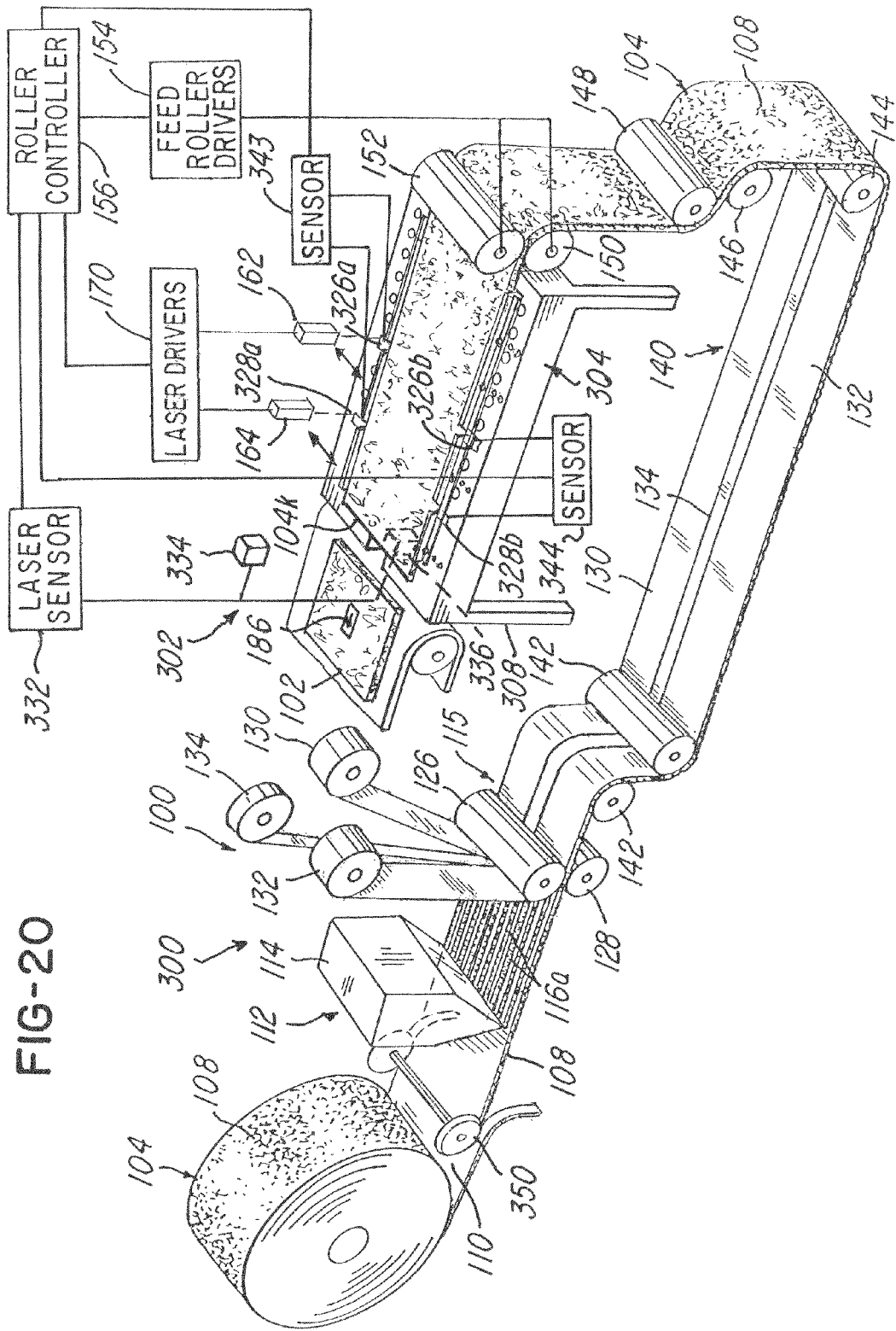
FIG. 20 is a perspective view of another embodiment of the invention.
Figure 21A:
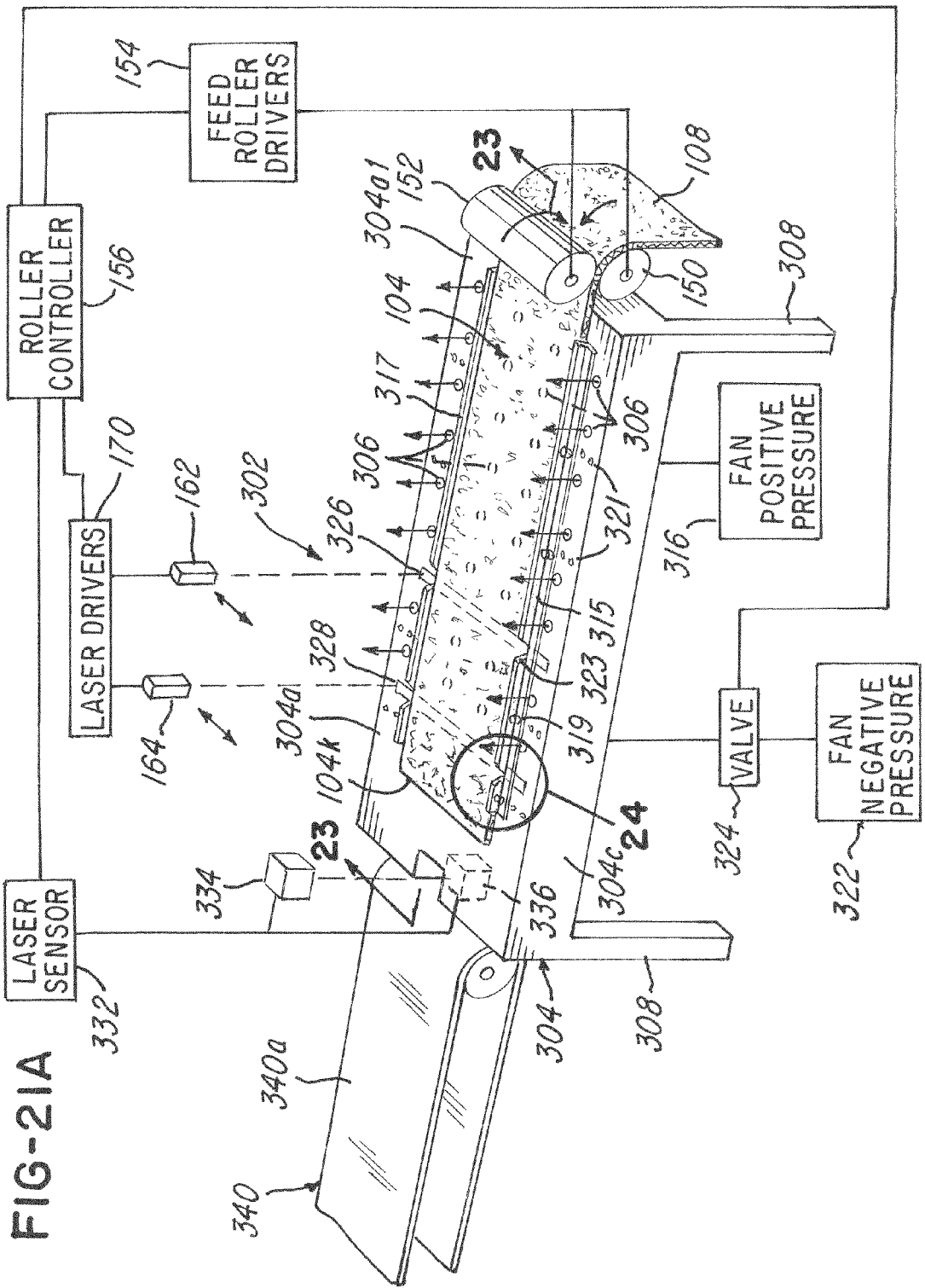
Figure 21B:
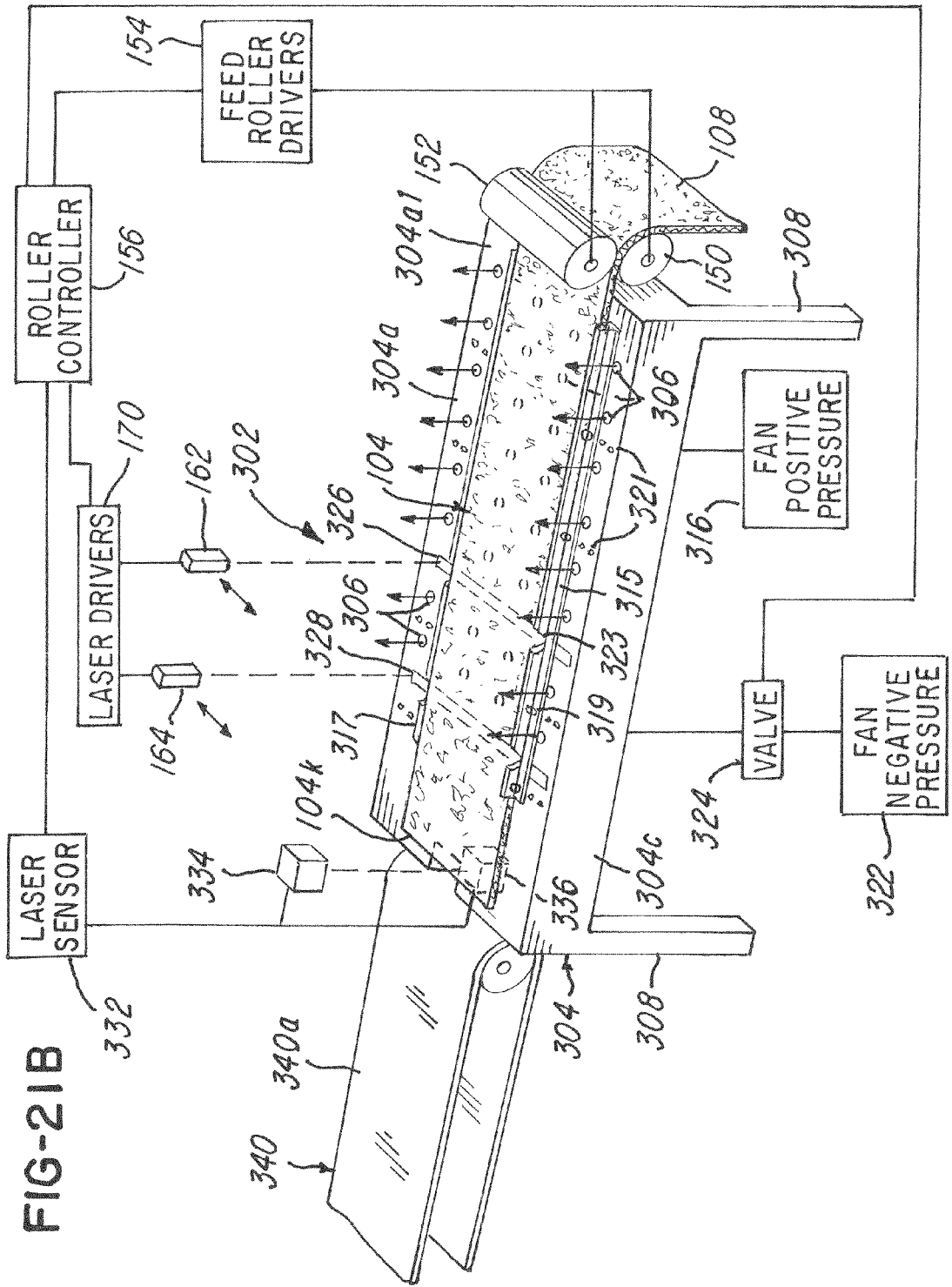
Figure 21C:
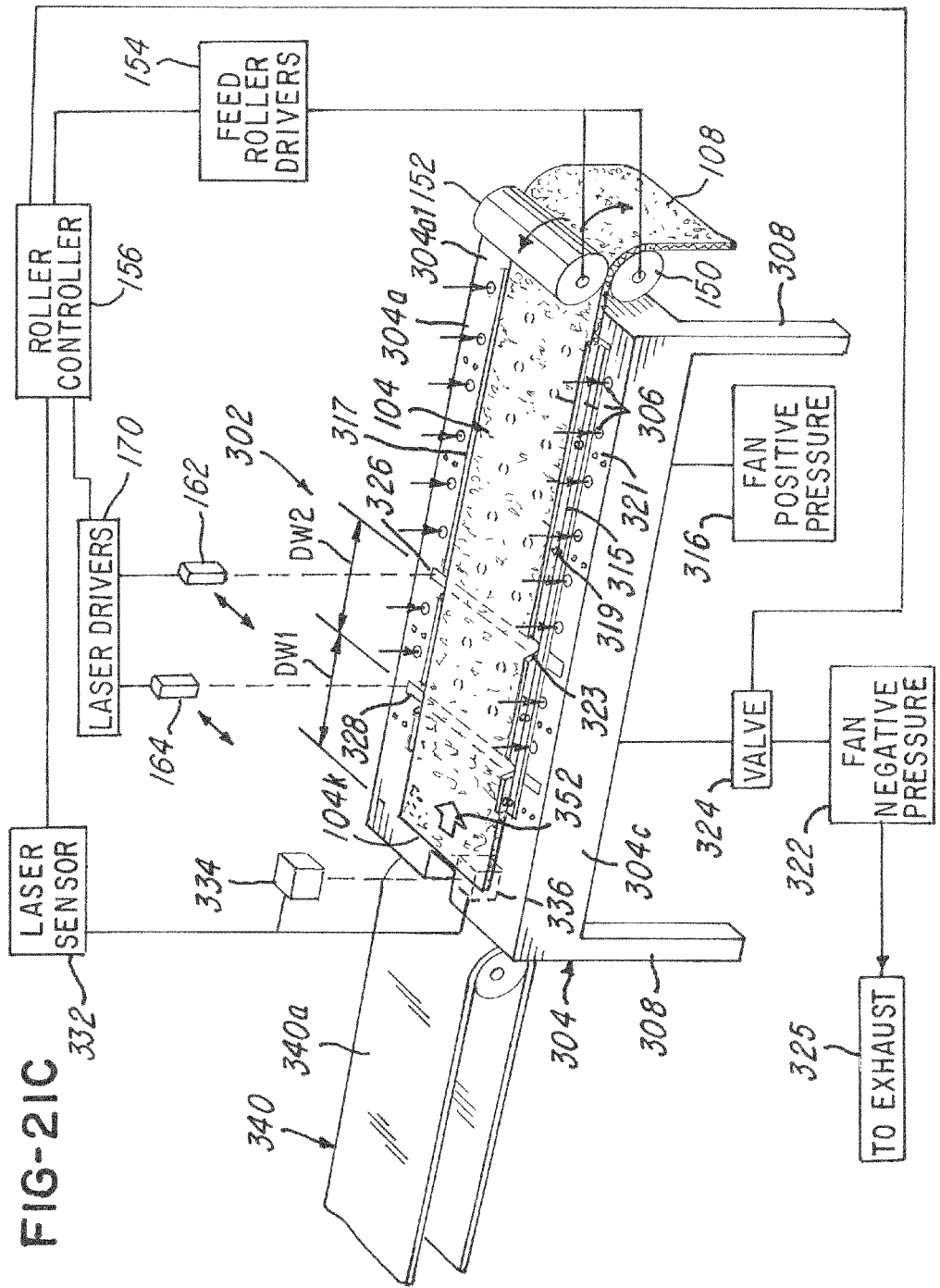

As illustrated in FIGS. 20-24, the system 300 comprises an air table 304 comprising a top planar member 304a that defines a working area, working surface or surface 304a1, a generally opposed second or bottom planar member 304b (FIG. 23) and a plurality of side walls 304c (FIGS. 21A and 21C). The table 304 comprises a plurality of legs 308 secured to the bottom planar member 304b for supporting the table 304 above the ground. The members 304a, 304b and side walls 304c are aluminum and welded together to provide and define an area or air chamber 314 as best shown in FIG. 23.

The top planar member 304a comprises a plurality of apertures 306 (FIGS. 21A and 23) for permitting airflow and providing negative and positive pressure to the web 104 in the manner described herein. Note that the chamber or area 314 is in fluid communication with the plurality of apertures 306. The table 304, pressure and feed rollers 150 and 152 provide or define a web handler for handling the web 104 prior to, during and after cutting.

As shown in FIGS. 21A-23, a positive pressure fan 316 is coupled to a bottom portion 318 of the chamber 314 and in fluid communication with an aperture 320 to provide positive air pressure into the area 314, through the apertures 306 and to the surface 304a1. During positive pressure, air flows through the apertures 306 over the surface 304a1 and provides an air cushion AC (see FIGS. 21A-21H) that provides a low friction surface. The positive airflow through the apertures 306 provides a low friction, air cushion (labeled AC in FIGS. 22 and 24) or air support for the web 104 to move across a surface 304a1 of the member 304a. In a manner described later herein, the air cushion AC supports the web 104 over the surface 304a1 to facilitate movement and transferring of the web 104 in the manner described herein.

The system 300 further comprises a negative pressure fan 322 that is coupled to a valve 324 which, in turn, is coupled to, and under the control of, the roller controller 156 as shown. During operation and as described later herein, when the valve 324 is open, the fan 322 evacuates the chamber 314 through an aperture 330 and provides a negative pressure and vacuum to the surface 304a1 via the apertures 306. When the valve 324 is open, the negative pressure is greater than the positive pressure provided by the fan 316 and overcomes the positive pressure to provide a vacuum through the apertures 306. This vacuum facilitates holding the web 104 against the surface 304a1 and providing tension or resistance against movement of the web 104, which feature is described later.

The surface 304a1 further comprises a plurality of laser apertures 326 and 328 that receives the laser beams from the lasers 162 and 164, respectively, and exhaust fumes created during the laser cutting of the web 104.

For ease of illustration, the lasers 162 and 164, as with the lasers 162-168 in the prior embodiment, are shown above or exploded away from the cutting station; however, it should be understood that during operation, the lasers 162-168 are situated typically less than one inch from the top surface 108. Also, the lasers 162-168 in all embodiments are supported on a conventional metal frame or track (not shown for ease of illustration understanding) for transverse movement across the path of the web 104.

As described later herein, when the lasers 162 and 164 are energized, the valve 324 is caused to be opened to provide the negative pressure in the chamber 314 which causes the chamber 314 to be exhausted through the aperture 330 (FIG. 23) in member 304b to which the fan 322 and valve 324 are in fluid communication. When the lasers 162 and 164 are energized to cut the web 104, any fumes are exhausted through the apertures 326 and 328 and port 330 by the fan 322. In this illustration, the fans 316 and 322 run continuously. However, the fan 322 is coupled to the chamber 314 through the valve 324, which is opened, for example, when the lasers 162 and 164 are energized, thereby exhausting any fumes resulting from the laser cutting while substantially simultaneously securing the web 104 at the cutting station 302 during cutting. In the illustration being described, the fan 316 provides airflow of about 250 cfm to provide the positive pressure, while fan 322 provides an airflow of about 500 cfm to provide the negative pressure. The operation and airflow will be described later herein.

Referring to FIGS. 20-23, notice that the system 300 comprises a laser sensor 332 having a transmitter 334 and a target or receiver 336. The laser sensor 332 is coupled to the roller controller 156 that energizes laser drivers 170 to drive the lasers 162 and 164 across the table in order to cut the web 104 in the manner described herein. As best illustrated in FIGS. 21A and 23, transmitter 334 and receiver 336 are operatively positioned to capture and sense an end 104k of the web 104. The roller controller 156 receives the sensed information from the laser sensor 332 and uses it to energize the feed roller drivers 154 to accurately position the web 104 at the cutting station 302 so that tiles T1 and T2 (FIG. 21H) in the illustration may be accurately cut. This operation will be described in more detail later herein.

As best illustrated in FIGS. 21A-21H, after tiles T1 and T2 are cut at cutting station 302, they are moved onto a moving conveyor 340 for transporting to a stacking or packaging area where they can be stored or packaged in containers for shipping. In the illustration being described, it should be understood that the conveyor 340 is coupled to a conveyor drive (not shown) that drives the conveyor 340 at a speed that is greater than the speed at which the feed rollers 150 and 152 drive the web 104 to the cutting station 302. Consequently, when a portion of the tile, such as tile T1 in FIG. 21F, is received on the conveyor 340 it is "grabbed" or "pulled" off the surface 304a1 at a speed that is greater than the speed at which the tile T2 and web 104 travels. This provides a separation distance SD (FIG. 21H) between the cut tiles T1 and T2, which in turn facilitates processing the tiles T1 and T2 for packaging or shipping as may be desired.

A plurality of end-of-run sensors 342 and 344 are associated with the ends 326a, 328a and ends 326b and 328b of the apertures 326 and 328, respectively, as shown in FIG. 20. The end-of-run sensors 342 and 344 sense when the lasers 162 and 164 have finished a cut. The end-of-run sensors 342 and 344 are coupled to the roller controller 156 which deenergizes the laser drivers 170 and lasers 162 and 164 when the lasers 162 and 164 have finished a laser cut across the web 104 in the manner described herein. In the illustration, the end-of-run sensors 342 and 344 are provided in laser controller driver 170 software which may be programmed by a user. In this regard, the laser controller driver 170, mechanisms, support, including any frames, gantries, support structures or drivers necessary for controlling and driving the lasers 162 and 164 are available from Kern Electronics & Lasers, Inc. of Wadena, Minn. As mentioned earlier herein, as is known in the laser art, one or more mirrors (not shown) may be provided to facilitate adjustment of the laser beam to the optics lens. As mentioned herein, the lasers 162 and 164 may be $CO_2$ 150 watt lasers available from Coherent Inc. of Santa Clara, Calif. The system and method for cutting the web 104 will now be described relative to FIGS. 20-21H.

With the prior embodiment and as illustrated in FIG. 20, the web 104 is provided in a predetermined width for applying the adhesive and release liners 130,132 and 134 in the manner described earlier herein relative to the embodiments of FIGS. 1-19I. If necessary, one or more slitters 350 (FIG. 20) may be provided for slitting a supply of material into the web 104 having a desired or predetermined width. The adhesive and release liners 130, 132 and 134 are applied as in prior embodiments.

A pair of guides 315 and 317 are provided to guide the web 104 to the cutting station 302. As illustrated in FIGS. 21A, 21E-21F and 24, notice that at least one of the guides, guide 315 in the example, is adjustable and can be moved to different positions relative to the opposing guide 317 using the bolts 319 and complementary threaded holes 321 in member 304a. Note that the guides 315 and 317 have a plurality of notched out or V-shaped openings 323 (FIGS. 23 and 24) to facilitate permitting the lasers 162 and 164 to travel past the guides 315 and 317 after cutting. After the web 104 is slit and the adhesive and release liners 130, 132 and 134 are applied in the manner described earlier herein, the web 104 is fed between the guides 315 and 317 which guides the web 104 to the cutting station 302 for cutting in the manner that will now be described.

For ease of illustration, FIGS. 21A-21H are views that do not show the various application steps upstream of the rollers 150 and 152 for ease of illustrating various features of this embodiment. As illustrated in FIGS. 21A-21B, the roller controller 156 energizes the feed roller driver 154 to rotatably drive the feed rollers 150 and 152 to advance the web 104 until the end 104k is sensed by the sensor 332 using the transmitter 334 and target 336. It should be appreciated that when the web 104 is being advanced or moved over the surface 304a1, the valve 324 is closed and fan 316 provides positive air pressure to enable the web 104 to easily float or move with low friction on the air cushion AC (FIGS. 22 and 23) over or across the surface 304a1.

When the sensor 332 senses the end 104k, the sensor 332 generates a signal which is received by the roller controller 156 which internally marks the position and which causes the feed roller driver 154 to cease advancing the web 104 as shown. The roller controller 156 actuates valve 324 to open which causes the negative pressure to vacuum and force web 104 against surface 304a1. The roller controller 156 substantially simultaneously energizes feed roller driver 154 to cause the feed rollers 150 and 152 to reverse the rotation so that the web 104 is driven backwards (as viewed in FIG. 21C) against the vacuum pressure and in the direction of arrow 352 in FIG. 21C for a predetermined distance from the position, such as distance DW1, which is programmed into the roller controller 156. In the illustration being described, the roller controller 156 can be programmed so that the distance DW1 can be any desired or predetermined distance, dimension or size. In the illustration being described, the roller controller 156 is a programmable controller available from Kern Electronics & Lasers, Inc. of Wadena, Minn.

Thus, it should be understood that the roller controller 156 comprises means for accurately energizing the feed roller drivers 154 to cause the rollers 150 and 152 to reverse the direction of the web 104 a desired distance so that the edge 104k becomes situated at the predetermined distance from laser 164 so that when the laser 164 moves transversely across the web 104 and cuts the tile T1, the tile T1 is cut at the desired dimension width or distance DW1. In the illustration being described, square tiles are cut and the dimension is approximately 12 inches in the illustration, but as with the prior embodiments, other non-square shapes (e.g. polygonal, circular, elliptical, irregular, non-symmetrical and the like) sizes or dimensions (e.g., 18 inches, 24 inches, 36 inches, 48 inches and other sizes.) may be selected as well.

Returning to the illustration, once the web 104 has been retracted so that the distance DW1 is achieved, the roller controller 156 ceases energizing the feed roller drivers 154. It should be understood that the web 104 is retracted while the valve 324 is open and the negative pressure is applied thereto. The inventor has found that this negative pressure provides resistance or tension that facilitates registering and accurately positioning the web 104 and cutting the web 104 at the cutting station 302.

As illustrated in FIG. 21C, the plurality of lasers 162 and 164 are provided, in the example, but it should be understood that more or fewer lasers could be used if desired. Also in the illustration, it is desired to cut square tiles of the same size so the dimensions or distances in the illustration are DW1, DW2 and the width across the web 104 is substantially the same, but it should be understood that these dimensions or distances could be different if desired.

After the web 104 is moved to the position such that the dimension or distance between the surface 304a1 and laser beam 164a is substantially the distance DW1, the web 104 is laser cut as mentioned earlier. As mentioned, the valve 324 remains open which not only provides negative pressure and resistance to the web 104, but also causes the exhaust fumes from the laser cut and/or debris to be evacuated by the fan 322. As mentioned earlier herein, it should be understood that the pressure provided by the fan 322 is greater than the pressure provided by the fan 316 so that a negative pressure is created at surface 304a1. Advantageously and as shown in FIG. 21C and 21D, this negative pressure also facilitates securing the web 104 against the surface 304a1 without the use of any platen or other means for holding the web 104 to the surface 304a1, as well as functions to evacuate the fumes resulting from the laser cut to exhaust 325.

Figure 21D:
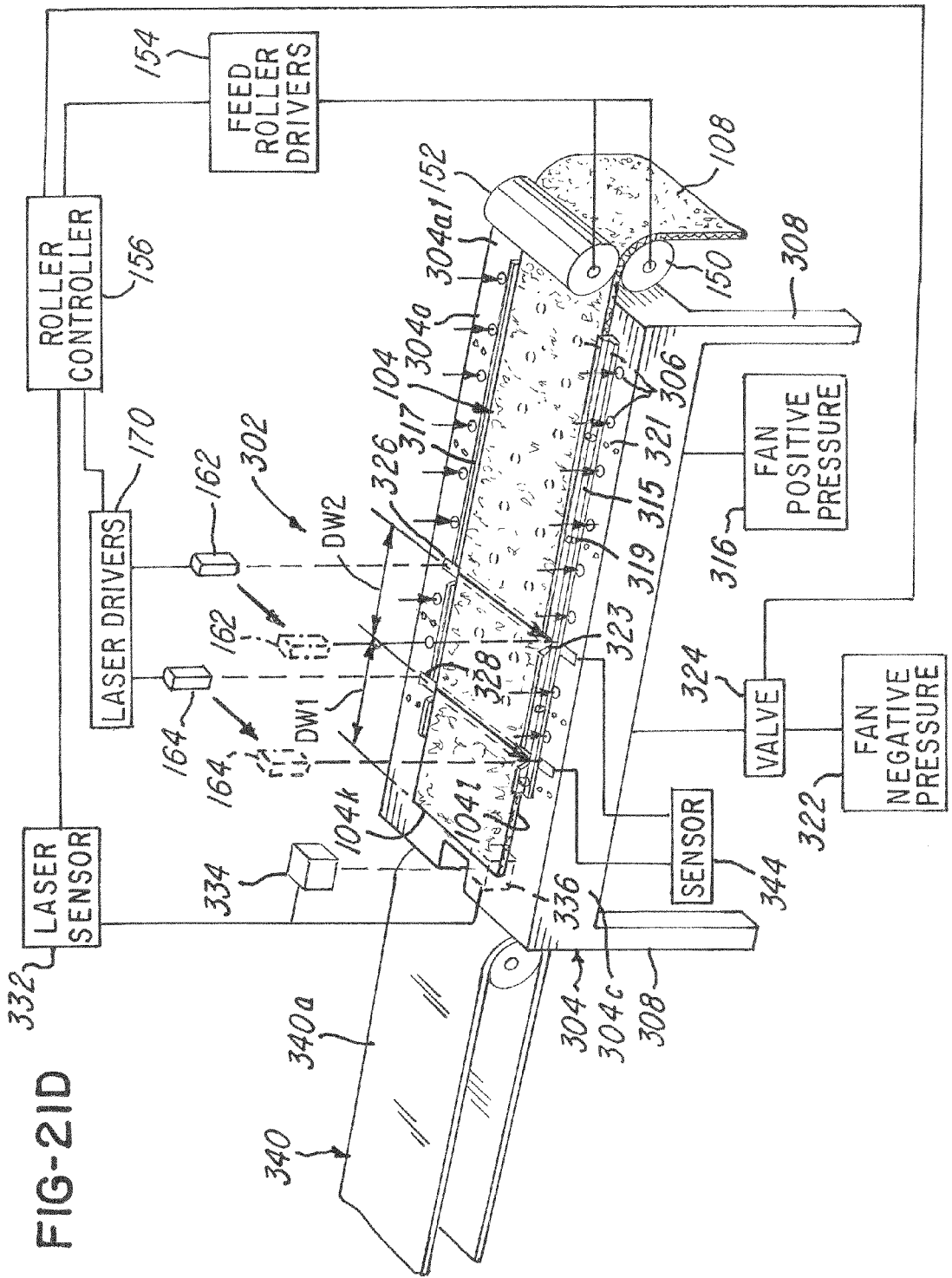
Figure 21E:
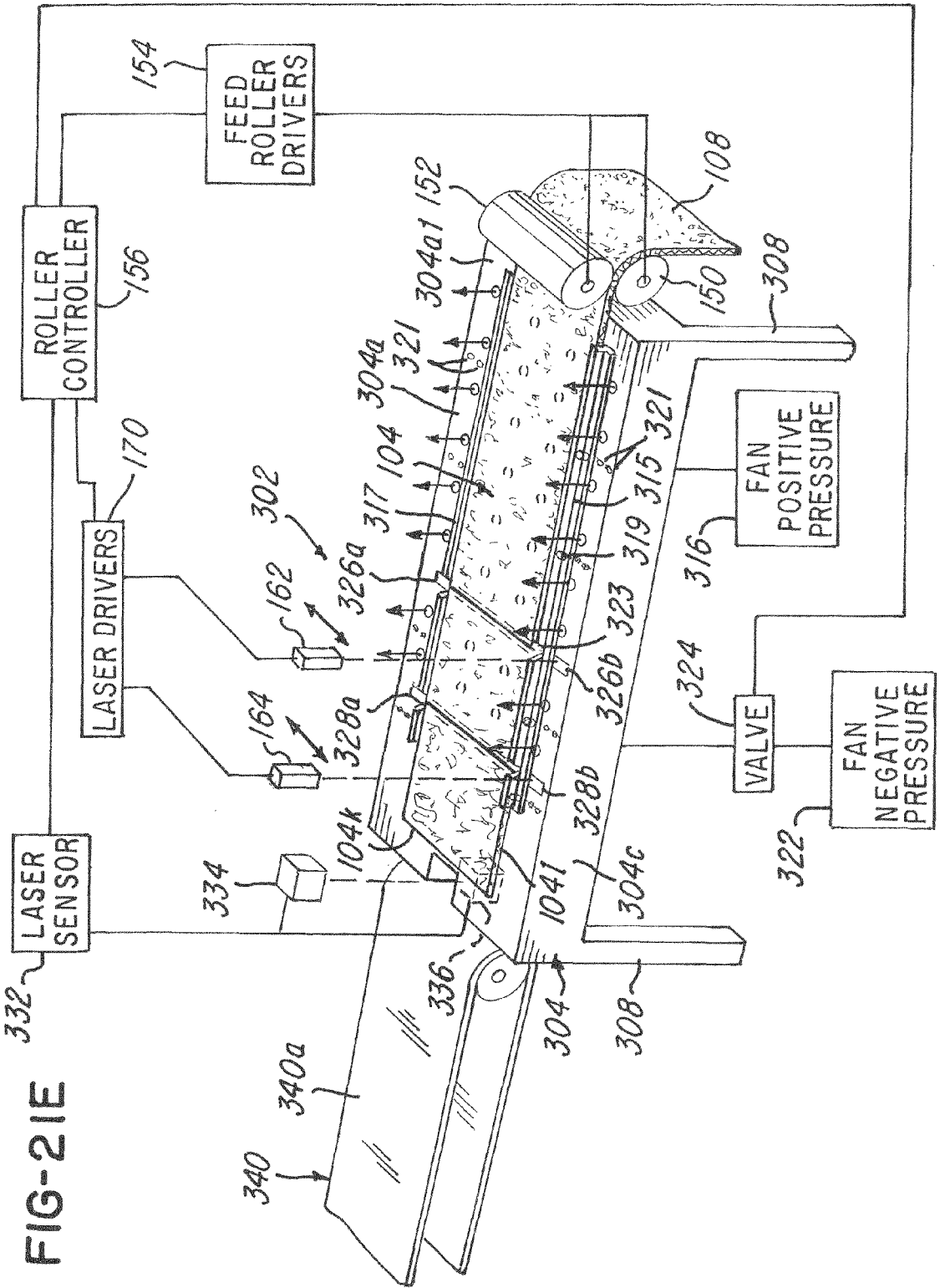
Figure 21G:
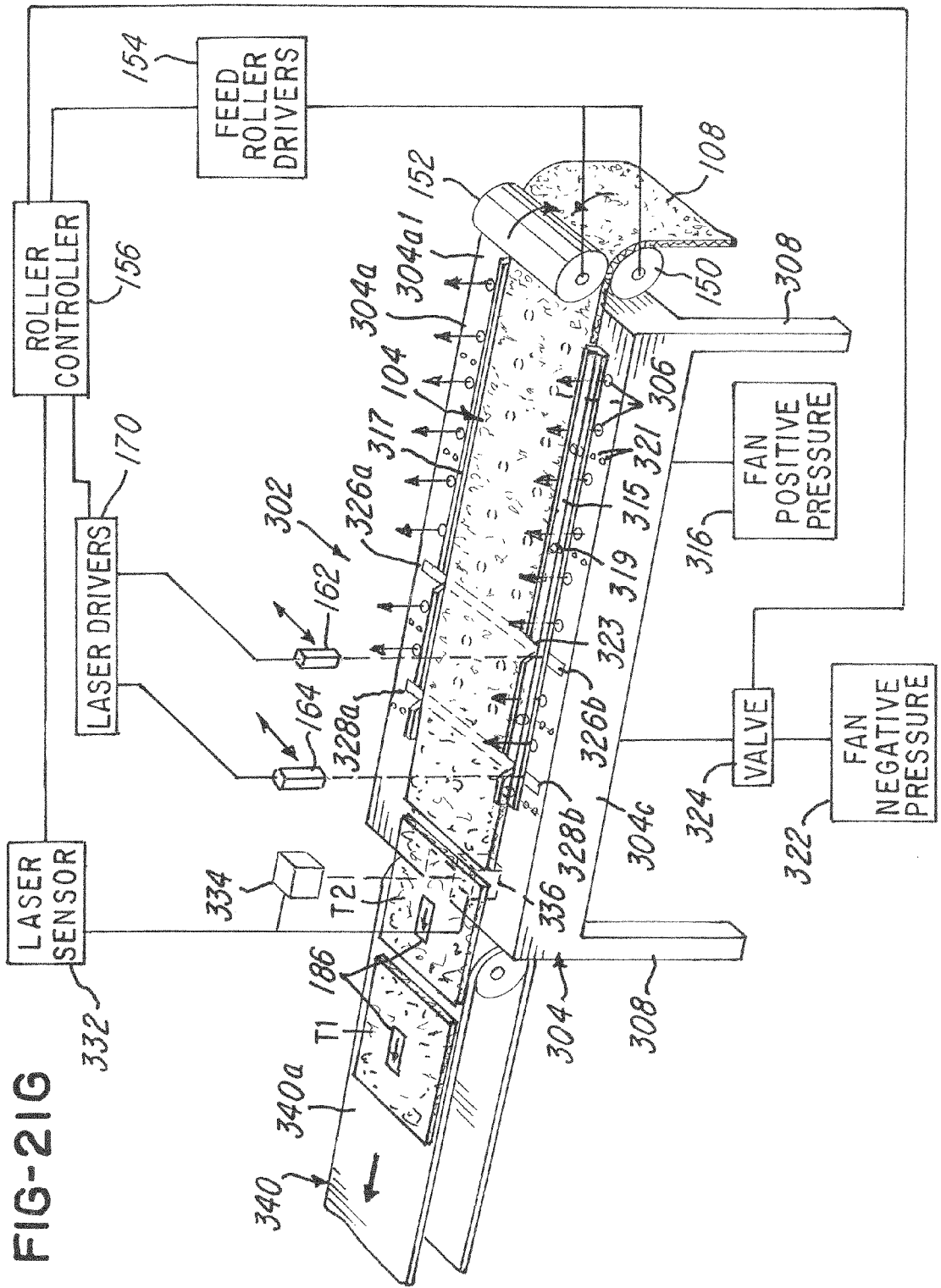
Figure 22:
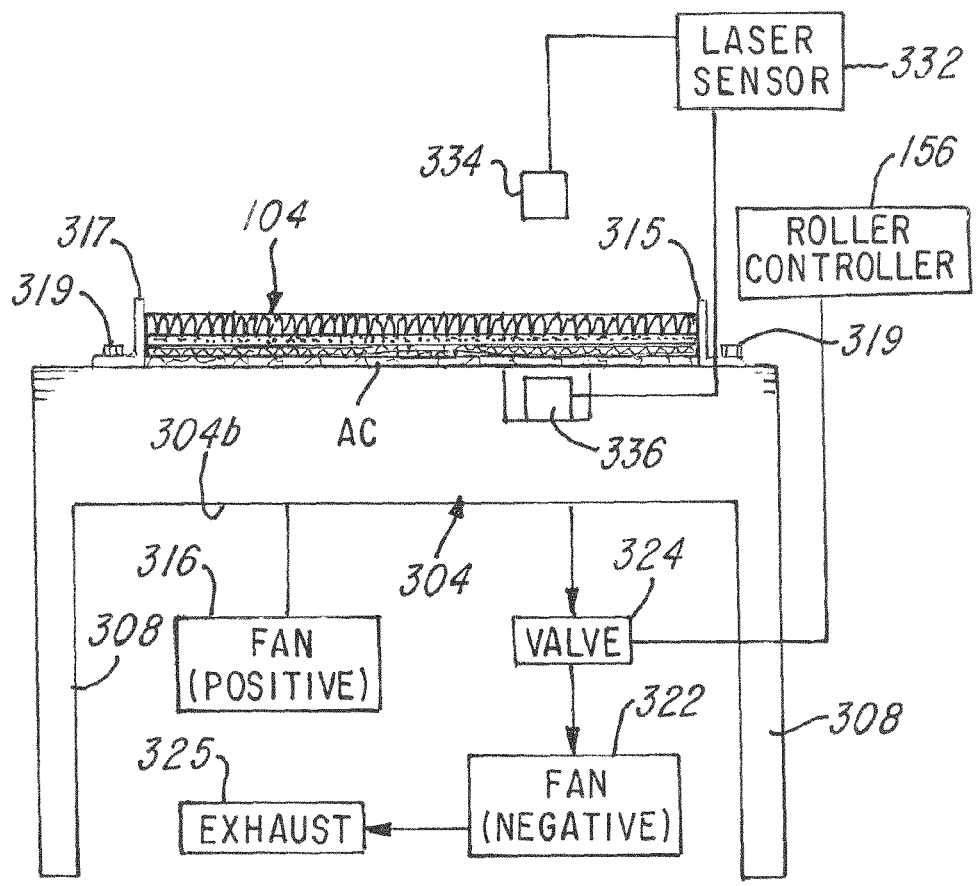
FIG. 22 is a view of an end of an air table used in the embodiment illustrated in FIG. 20 illustrating the sensors and air cushion on which the web moves over a surface of the air table.
Figure 24:
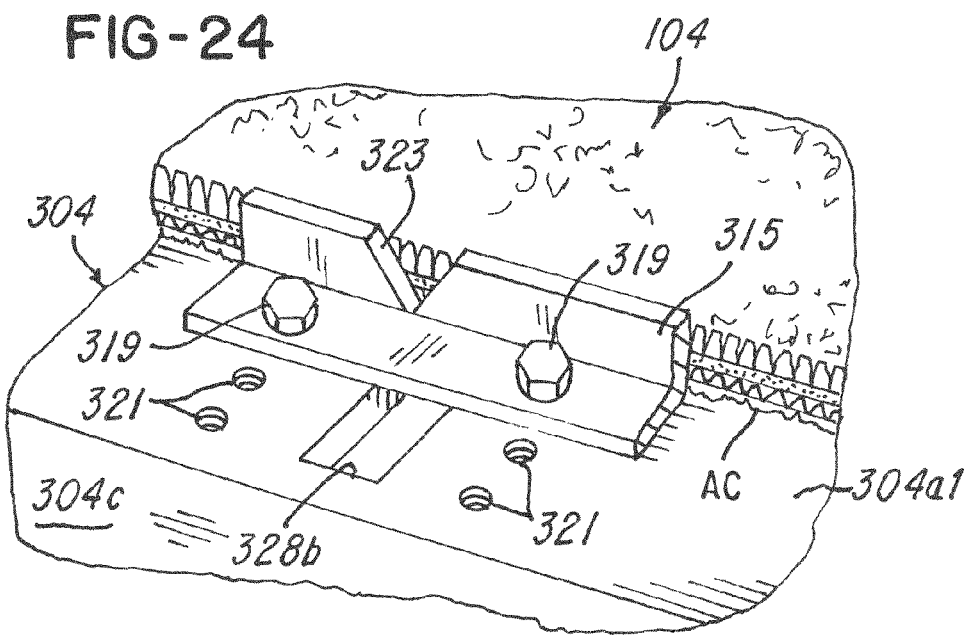
FIG. 24 is a fragmentary enlarged view of the area 24 in FIG. 21A illustrating an adjustable guide and notched out portion for permitting a laser to move past the guides.

Continuing with the illustration, as the web 104 is being held to the surface 304a1, the roller controller 156 energizes the laser drivers 170 to drive the lasers 162 and 164 across and over the web 104 from the position shown in FIG. 21D to the phantom position shown in FIG. 21D, thereby resulting in the tiles T1 and T2 being cut. In the illustration being described, the end-of-run sensor 344 senses the lasers 162 and 164 reaching the end of the cut, which corresponds to the width or dimension of the web 104 selected distance past the side edges, such as edge 104l (FIG. 21D). The sensed information is provided to the roller controller 156 which then actuates the valve 324 to the closed position which ceases negative pressure from fan 322 and enables positive pressure from fan 316 (FIGS. 21E and 21G) to resume and to provide the air cushion AC to support the web 104 above the surface 304a1. The roller controller 156 also energizes the feed roller drivers 154 to advance web 104 which pushes the cut tiles T1 and T2 toward the conveyor 340 and in the direction of arrow 356 (FIG. 21F). As the web 104 is driven, the tile, such as tile T1, is received on the conveyor 340 as illustrated in FIG. 21G. At this time or preferably after the tiles T1 and T2 have been cut, the label 186 may be applied to the tiles T1 and T2.

As mentioned earlier herein, the conveyor 340 is driven at a higher speed than the speed at which the rollers 150 and 152 drive the web 104 so that when the tile T1 is picked up by the conveyor 340 it is pulled onto the conveyor's surface 340a and the separation distance SD (FIG. 21H) is created between the cut tiles T1 and T2. As illustrated in FIGS. 21F-21G, the second tile T2 is also received on the conveyor surface 340a and pulled and separated from the end 104k (FIG. 21H) as shown. Note that the web 104 is advanced until the end 104k (FIG. 21H) is sensed by the laser sensor 332 at which time the process and system repeats the cutting procedure in the manner described earlier relative to FIGS. 21B-21H.

Advantageously, this system and method provide means for supporting the web 104 above the surface 304a1 and for facilitating moving the web 104 over the surface 304a1 and to the cutting station 302. The system and method also provide means for securing the web 104 against the surface 304a1 during cutting by the lasers 162 and 164 and substantially simultaneously exhausting any fumes created by the lasers 162 and 164 through the apertures 326 and 328. The system and method 300 provide means and apparatus for supporting the web 104 with the air cushion AC and/or for facilitating low friction movement and travel of the web 104 over the surface 304a1, while substantially simultaneously providing resistance to movement of the web 104a1 and facilitating securing the web 104 with negative pressure against the surface 304a1 without the need for any platens or other holding devices which can cause misalignment and misregistration of the web 104 during cutting.

Advantageously, the various embodiments enable, among other things, cutting of the web 104 after the adhesive 116 is applied and the release liners 130, 132 and 134 are applied. The system enables cutting the web 104 from the top surface 108 if desired, and without any backing or support of the type used with prior art cutters like knifes and blades. Various advantageous unique features are achieved by the embodiments described herein, including but not limited to:

Utilizing multiple release tapes or liners 130, 132 and 134 (FIGS. 13 and 14);
  Illustrating a nap direction on surface of the tile with label 186 (FIGS. 15A-17);
  Using a diffusing laser beam to create an angled cut or undercut bevel (FIGS. 10-12), with most cases, laser cuts through from the top surface of the tile; and
    Providing the air table 304 that provides ease of maneuvering the web 104 and tile material utilizing positive and negative pressure with a mode of operation at this time to apply constant positive air flow and pressure during forward movement of the web 104 and then applying negative pressure exceeding the positive air flow or pressure when necessary, such as when backing up the web 104 and while cutting the tiles T1 and T2.

Various modifications can be made in my invention as described herein, and many different embodiments of the device and method can be made while remaining within the spirit and scope of the invention as defined in the claims without departing from such spirit and scope. It is intended that all matter contained in the accompanying specification shall be interpreted as illustrative only and not in a limiting sense.

What is claimed is:

1. A covering to be installed on a surface, comprising:
  a fibrous layer having a top fibrous surface, a bottom surface and a plurality of edges;
  an adhesive layer applied to said bottom surface of said fibrous layer, wherein said adhesive layer is formed in spaced bands, lines, strips or rows across said bottom surface; and
  a release sheet removably secured to said adhesive layer, wherein said release sheet includes at least one main sheet and a positioning sheet overlapping said at least one main sheet for removal prior to said at least one main sheet to expose only a portion of said adhesive layer, wherein said at least one main sheet includes an overhanging edge that is folded over an edge of said fibrous layer and onto said top fibrous surface.

2. The covering of claim 1, wherein said fibrous layer includes a mix of wool, nylon, or polyester fibers dispersed within polypropylene fibers.

3. The covering of claim 1, wherein said adhesive layer is a removable adhesive.

4. The covering of claim 1, wherein said release sheet covers substantially the entire adhesive layer.

5. The covering of claim 1, wherein said covering is a tile.

6. The covering of claim 5, further comprising a plurality of tiles, assembled directly adjacent to each other.

7. The covering of claim 1, wherein said folded edge is secured with a tab to said fibrous layer.

8. The covering of claim 7, wherein said tab includes indicia for installing said covering in a desired orientation.

9. The covering as recited in claim 1 wherein said covering is installed on a surface in accordance with a method comprising the steps of:
  providing a plurality of pieces of said covering, each piece formed as a tile made of a fibrous layer having a top fibrous surface, a bottom surface and a plurality of edges, an adhesive layer applied to said bottom surface of said fibrous layer, wherein said adhesive layer is formed in spaced bands, lines, strips or rows across said bottom surface, and said release sheet removably secured to said adhesive layer, wherein said release sheet includes said at least one main sheet and said positioning sheet overlapping said at least one main sheet, wherein said at least one main sheet includes said overhanging edge carrying positioning indicia that is folded over said edge of said fibrous layer and onto said top fibrous surface;
  positioning one of the tiles at a determined location on the surface using said positioning indicia on said folded edge of said at least one main sheet;
  removing said positioning sheet to expose only a portion of said adhesive layer and tacking a first tile at a desired location;
  removing said at least one main sheet to adhere said first tile in said determined location; and
  positioning another tile at a determined location directly adjacent to said first tile;
  removing said positioning sheet of a second tile to expose only a portion of said adhesive layer and tacking said second tile at a desired location; and
  removing said at least one main sheet to adhere said second tile in said determined location next to said first tile.

10. The covering of claim 9, wherein said covering is installed on a surface in accordance with the method further comprising the step of positioning a plurality of tiles to cover an entire surface.

11. The covering of claim 9, wherein said overhanging edge is secured to said top fibrous surface with a tab that carries said positioning indicia.

12. A covering for removably mounting on a surface, said covering comprising:
  a plurality of tiles, each of said plurality of tiles comprising a nap and being removably mounted to the surface in a predetermined order;
  each of said plurality of tiles comprising:
    a fibrous layer having a top surface and a bottom surface and a plurality of edges;
    an adhesive applied in an intermittent pattern to said bottom surface of said fibrous layer; and
    at least one release liner applied to said adhesive;
  said fibrous layer receiving said adhesive, said at least one release liner and having a plurality of laser-cut edges, each of said plurality of laser-cut edges being defined by a single or common laser cut made substantially simultaneously through each of said fibrous layer, said adhesive and said release liner, each of said plurality of laser-cut edges is being defined by said laser cut and extending completely through each of said fibrous layer, said adhesive and said release liner; said plurality of laser-cut edges of each of said plurality of tiles consisting essentially of a first laser-cut edge and a generally opposing second laser-cut edge with any remaining edges not being laser-cut edges.

13. The covering of claim 12 wherein said covering is manufactured in accordance with a method comprising the steps of:
providing a strip of fibrous material having said top surface, said bottom surface and said plurality of opposed edges;
applying said adhesive in an intermittent pattern on said bottom surface of said strip of fibrous material;
applying a release sheet over said adhesive on said bottom surface of said strip of fibrous material; and,
separating said strip of fibrous material with said adhesive and said release sheet thereon by a non-mechanical mechanism into individual pieces to provide said plurality of tiles.

14. The covering of claim 13, wherein separating said strip of fibrous material into pieces includes cutting said strip of fibrous material with a laser.

15. The covering of claim 13, wherein said method further comprises the step of providing a roll of fibrous material and slitting said roll of fibrous material into said strip of fibrous material.

16. The covering of claim 13, wherein applying said adhesive in said intermittent pattern includes applying rows of adhesive beads or adhesive strips.

17. The covering of claim 16, wherein said covering is manufactured in accordance with the method further comprising the step of pressing said adhesive beads or strips into said bottom surface and forming said adhesive beads or strips into bands, lines, strips or rows.

18. The covering of claim 16, wherein applying said release sheet includes pressing said release sheet onto said bottom surface and thereby pressing said adhesive beads or strips into said bottom surface and forming said adhesive beads or strips into bands, lines, strips or rows.

19. The covering of claim 13, wherein applying said release sheet includes applying a main sheet and a positioning sheet that overlaps said main sheet and covers a portion of said bottom surface.

20. The covering of claim 13, wherein applying said release sheet includes positioning the at least one main sheet to overhang edges of said strip of fibrous material.

21. The covering of claim 20, wherein said covering is manufactured in accordance with the method further comprising the step of folding said overhanging edges of said release sheet to overlap said top fibrous surface.

22. The covering of claim 12 wherein said covering is manufactured in accordance with the method comprising the steps of:
applying said adhesive to a web of fibers that define said fibrous layer;
pressing said adhesive into said web of fibers; and
cutting through said web of fibers, and said adhesive and said at least one release liner into said covering having a predetermined shape without using a cutter after said applying adhesive step.

23. The covering as recited in claim 22 wherein said cutting step further comprises the steps of:
performing said applying and pressing steps before said cutting step; and
cutting said web of fibers from a fibrous side that does not have adhesive thereon.

24. The covering as recited in claim 22 wherein said cutting step comprises the step of:
cutting said web of fibers using at least one laser cutter or water jet cutter.

25. The covering as recited in claim 23 wherein said cutting step comprises the step of:
cutting said web of fibers using at least one laser cutter.

26. The covering as recited in claim 22 wherein said cutting step comprises the step of:
cutting said web of fibers using a plurality of laser cutters.

27. The covering as recited in claim 26 wherein said plurality of laser cutters are driven across said web of fibers simultaneously.

28. The covering as recited in claim 27 wherein each of said plurality of laser cutters are driven in a path that is substantially perpendicular to adjacent paths.

29. The covering as recited in claim 22 wherein said predetermined shape is a square tile.

30. The covering as recited in claim 22 wherein said cutting step comprises the step of:
cutting a top surface of said web of fibers.

31. The covering as recited in claim 22 wherein said method further comprises the step of:
applying a removable indicia to a top surface of said covering, said removable indicia providing an indication of a nap of said web of fibers.

32. The covering as recited in claim 22 wherein said web of fibers comprises said top surface and said bottom surface that lies in a first plane, said pressing step further comprises the step of:
pressing said adhesive into said web of fibers so that a portion of said adhesive lies on a first side of said first plane and a second portion of said adhesive lies on a second side of said first plane.

33. The covering as recited in claim 22 wherein said web of fibers comprises a top surface and a bottom surface, said cutting step comprises the step of:
performing a cut in a cutting plane that diffuses away from said cutting plane as said non-contact cut extends away from said top surface toward said bottom surface such that in cross section, each cut edge defines an acute angle relative to said cutting plane or beveled undercut.

34. The covering as recited in claim 22 wherein said applying step comprises the step of:
applying said adhesive in an arrangement selected in response to a desired amount of bond between said covering and the surface.

35. The covering as recited in claim 22 wherein said applying step further comprises the step of:
applying said adhesive on said web of fibers in beads or strips;
pressing said beads or strips so that a first portion of each of said beads or strips becomes pressed into said web of fibers and a second portion of each of said beads or strips becomes flattened out to form a strip or band on a bottom surface of said web of fibers.

36. The covering as recited in claim 22 wherein said method further comprises the step of:
removably securing a plurality of release sheets to said adhesive.

37. The covering as recited in claim 22 wherein said covering defines a carpet tile.

* * * * *